(12) United States Patent
Lin

(10) Patent No.: US 6,246,960 B1
(45) Date of Patent: Jun. 12, 2001

(54) ENHANCED INTEGRATED POSITIONING METHOD AND SYSTEM THEREOF FOR VEHICLE

(76) Inventor: Ching-Fang Lin, 9131 Mason Ave., Chatsworth, CA (US) 91311

( * ) Notice: Subject to any disclaimer, the term of this patent is extended or adjusted under 35 U.S.C. 154(b) by 0 days.

(21) Appl. No.: 09/277,323

(22) Filed: Mar. 26, 1999

Related U.S. Application Data

(60) Provisional application No. 60/107,472, filed on Nov. 6, 1998.
(51) Int. Cl.[7] .................................................. G01C 21/00
(52) U.S. Cl. ......................... 701/214; 701/207; 701/213; 701/220
(58) Field of Search ..................................... 701/200, 207, 701/213, 214, 220; 342/357.01, 357.05, 357.06

(56) References Cited

U.S. PATENT DOCUMENTS 5,740,048 * 4/1998 Abel et al. ........................... 701/200

OTHER PUBLICATIONS

Gray et al., "An Integrated GPS/INS/BARO and Radar Altimeter system for Aircraft Precision Approach Landings" Proceedings of the 1995 NAtional Aerospace and Electronics Conference, vol. 1, pp. 161–168, 1995.*

Hein et al., "Experiments for an integrated precise airborne navigation and recovery system" Position Location and Navigation Symposium, IEEE Plans '90. pp. 279–285, 1990.*

Braden et al., Integrated inertial navigation system/Global Positioning system for manned return vehicle autoland operation, Position Location and Navigation Symposium, IEEE Plans '90, pp. 74–82, 1990.*

* cited by examiner

Primary Examiner—Ian J. Lobo
(74) Attorney, Agent, or Firm—Raymond Y. Chan; David and Raymond Patent Group

(57) ABSTRACT

An enhanced positioning method and system with altitude measurement includes the steps of receiving the inertial measurements from an inertial sensor, the global positioning system raw measurements from a global positioning system processor, and the altitude measurement from an altitude measurement device and performing integrated filtering, feeding the velocity and acceleration back to the global positioning system satellite signal tracking loops, and using integration solution to aid the global positioning system satellite signal carrier phase ambiguity resolution. The present invention provides a positioning method and system with high accuracy and robustness. The global positioning system measurements assure the long term positioning accuracy and the inertial measurements assure the short term positioning accuracy. The altitude measurement improves the vertical positioning accuracy. The velocity and acceleration from the inertial device aid the global positioning system signal tracking. The integrated positioning solution is employed to derive the global positioning system carrier phase ambiguity number. The present patent supports high precision navigation in general aviation and space applications. It also supports high precision approach and landing for aircraft, reusable launch vehicles, and other air transportation vehicles.

53 Claims, 16 Drawing Sheets

US 6,246,960 B1

ENHANCED INTEGRATED POSITIONING METHOD AND SYSTEM THEREOF FOR VEHICLE

CROSS REFERENCE OF RELATED APPLICATION

This is a regular application of a provisional application having an application Ser. No. of 60/107,472 and a filing date of Nov. 6, 1998.

FIELD OF THE PRESENT INVENTION

The present invention relates generally to an integrated positioning method, and more particularly to a method for enhancing global positioning system/inertial measurement unit (GPS/IMU) positioning processing with altitude measurement, which allows the mutual aiding operation of the global positioning system receiver and the inertial navigation system at an advanced level with features of inertial aiding global positioning system satellite signal tracking and rapid global positioning system signal carrier phase integer ambiguity resolution, and provides a means to blend the height information from an altitude measurement device to improve the vertical positioning accuracy.

BACKGROUND OF THE PRESENT INVENTION

The global positioning system is a space-based, worldwide, all-weather passive radio positioning and timing system which was developed and implemented over the past two decades. The system is originally designed to provide precise position, velocity, and timing information on a global common grid system to an unlimited number of adequately equipped air, land, sea, and space authorized users and civil users.

The global positioning system user equipment, which consists of an antenna, a signal processing unit, and associated electronics and displays, receives the signals from the global positioning system satellites to obtain position, velocity, and time solution. The global positioning system principle of operation is based on range triangulation. Because the satellite position is known accurately via ephemeris data, the user can track the satellite's transmitted signal and determine the signal propagation time. Since the signal travels at the speed of light, the user can calculate the geometrical range to the satellite. The actual range measurement (called the pseudorange) contains errors, for example bias in the user's clock relative to global positioning system reference time. Because atomic clocks are utilized in the satellites, their errors are much smaller in magnitude than the users' clocks. Thus, for three-dimensional position determination, and also to calculate the cock bias, the pure global positioning system needs a minimum of four satellites to obtain a navigation solution.

Global positioning system contains a number of error sources: the signal propagation errors, satellites errors, and the selective availability. The user range error (URE) is the resultant ranging error along the line-of-sight between the user and the global positioning system satellite. Global positioning system errors tend to be relatively constant (on average) over time, thus giving global positioning system long-term error stability. However, the signals of the global positioning system may be intentionally or unintentionally jammed or spoofed, or the global positioning system receiver antenna may be obscured during vehicle attitude maneuvering. The global positioning system signals are lost when the signal-to-noise ratio is low and the vehicle is undergoing highly dynamic maneuvers.

An inertial navigation system comprises an onboard inertial measurement unit, a processor, and an embedded navigation software. The positioning solution is obtained by numerically solving Newton's equations of motion using measurements of vehicle specific forces and rotation rates obtained from onboard inertial sensors. The onboard inertial sensors consist of accelerometers and gyros which together with the associated hardware and electronics comprise the inertial measurement unit.

The inertial navigation system may be mechanized in either a gimbaled or strapdown configuration. In a gimbaled inertial navigation system, the accelerometers and gyros are mounted on a gimbaled platform to isolate the sensors from the rotations of the vehicle, and to keep the measurements and navigation calculations in a stabilized navigation coordinated frame. Possible navigation frames include earth centered inertial (ECI), earth-centered-earth-fix (ECEF), locally level with axes in the directions of north, east, down (NED), and locally level with a wander azimuth. In a strapdown inertial navigation system, the inertial sensors are rigidly mounted to the vehicle body frame, and a coordinate frame transformation matrix (analyzing platform) is used to transform the body-expressed acceleration and rotation measurements to a navigation frame to perform the navigation computation in the stabilized navigation frame. Gimbaled inertial navigation systems can be more accurate and easier to calibrate than strapdown inertial navigation systems. Strapdown inertial navigation systems can be subjected to higher dynamic conditions (such as high turn rate maneuvers) which can stress inertial sensor performance. However, with the availability of newer gyros and accelerometers, strapdown inertial navigation systems are becoming the predominant mechanization due to their low cost and reliability.

Inertial navigation systems in principle permit pure autonomous operation and output continuous position, velocity, and attitude data of vehicle after initializing the starting position and initiating an alignment procedure. In addition to autonomous operation, other advantages of inertial navigation system include the full navigation solution and wide bandwidth. However, an inertial navigation system is expensive and subject to drift over an extended period of time. It means that the position error increases with time. This error propagation characteristic is primarily caused by its inertial sensor error sources, such as gyro drift, accelerometer bias, and scale factor errors.

The inherent drawbacks of a stand-alone inertial navigation system and a stand-alone global positioning system show that a stand-alone inertial navigation system or a stand-alone global positioning system can not meet mission requirements under some constraints such as low cost, high accuracy, continuous output, high degree of resistance to jamming and high dynamic.

In the case of integration of global positioning system with inertial navigation system, the short term accuracy of the inertial navigation system and the long term stability and accuracy of global positioning system directly complement each other.

One of integration approaches of global positioning system and inertial navigation system is to reset directly the inertial navigation system with global positioning system-derived position and velocity. The second approach is the cascaded integration where the global positioning system-derived position and velocity are used as the measurements in an integration Kalman filter. These two integration modes are called loosely-coupled integration. The third approach uses an extended kalman filter to process the raw pseudorange and delta range measurements of the global positioning system to provide optimal navigation parameter error estimates of the inertial navigation system, inertial sensor errors, and the global positioning system receiver clock offset. This approach is called tightly-coupled integration.

The shortcomings of the above-mentioned integration approaches are:

1. In the conventional global positioning system and inertial navigation system integration approaches, only position and velocity derived by global positioning system receiver or global positioning system raw pseudorange and delta range measurements are used. In fact, the raw carrier phase measurements of global positioning system have the highest measurement accuracy, but are not employed to contribute to an integration solution due to the difficulty of resolving the carrier phase ambiguity.

2. A significant impediment to the aiding of global positioning system signal tracking loops with inertial navigation system is that the aiding causes potential instability of the conventional global positioning system and inertial navigation integration system because there is a positive feedback signal loop in the combined global positioning and inertial system. The accuracy degradation of the inertial aiding data increases the signal tracking errors. The increased tracking errors fed to the inertial system may cause further degradation of inertial system because the measurements may severely affect the Kalman filter, which is well tuned for a low accuracy inertial navigation system.

3. In conventional tightly-coupled global positioning and inertial integration system, low accurate inertial sensor can not provide global positioning system satellite signal carrier phase tracking with velocity aiding because the aiding of carrier phase tracking loop requires high accuracy of external input velocity.

4. The conventional loosely-coupled global positioning and inertial integration system requires at least four global positioning system satellites available because a global positioning system processor requires at least four global positioning system satellites to derive the vehicle position and velocity, which are used in the loosely-coupled integration algorithm. This constraints the application of the loosely-coupled integration system. The second shortage of the loosely-coupled integration system is its bad dynamic performance because of without aiding of global positioning system code tracking from the external sensor.

5. The conventional global positioning and inertial integration processing has a poor vertical measurement accuracy.

SUMMARY OF THE PRESENT INVENTION

It is a main objective of the present invention to provide an enhanced positioning method and system which can improve the vertical positioning accuracy of the global positioning system/inertial measurement unit integrated positioning system by incorporating altitude measurement from an altitude measurement device, such as a radar altimeter, into the global positioning system/inertial measurement unit integrated positioning system.

Another objective of the present invention is to provide an enhanced positioning method and system, in which the altitude measurement from an altitude measurement device, such as a radar altimeter, is incorporated into the tightly-coupled global positioning system/inertial measurement unit integrated positioning system to improve the vertical positioning accuracy.

Another objective of the present invention is to provide an enhanced positioning method and system, in which the altitude measurement from an altitude measurement device, such as a radar altimeter, is incorporated into the loosely-coupled global positioning system/inertial measurement unit integrated positioning system to improve the vertical positioning accuracy.

It is another objective of the present invention to provide an enhanced positioning process and system with altitude measurement, in which the velocity and acceleration from an inertial navigation processor, which can be corrected by a kalman filter, are used to aid the code and carrier phase tracking of the global positioning system satellite signals, so as to enhance the performance of the global positioning and inertial integration system, especially in heavy jamming and high dynamic environments, and/or to prevent loss of satellite signal and carrier phase clips encountered in a global positioning system receiver.

It is another objective of the present invention to provide an enhanced positioning method and system with altitude measurement, in which the inertial navigation system aids the satellite signal integer ambiguity resolution of the global positioning system by providing more accurate position information.

It is a further objective of the present invention to provide an enhanced positioning method and system with altitude measurement, in which the integrated navigation solution of global positioning system, inertial measurement unit, and altitude measurement device aid the satellite signal integer ambiguity resolution of the global positioning system by providing more accurate position information and error covariance matrix.

It is another objective of the present invention to provide an enhanced positioning method and system with altitude measurement, in which the satellite signal carrier phase measurements are used in the kalman filter, as well as the pseudorange and delta range of the global positioning system, to improve the accuracy of integration positioning solution.

Another objective of the present invention is to provide an enhanced positioning method and system with altitude measurement, in which a kalman filter is implemented in real time to optimally blend the global positioning system raw data, the inertial navigation solution, and the altitude measurement, and to estimate the navigation solution.

Another further objective of the present invention is to provide an enhanced positioning method and system with altitude measurement, in which a robust kalman filter is implemented in real time to eliminate the possible instability of the integration solution.

Another objective of the present invention is to provide an enhanced positioning method and system with altitude measurement, in which a low accurate inertial sensor can be used for achieving a high accurate integration solution due to the aiding of global positioning system measurement and altitude measurement.

In order to accomplish the above objectives, the present invention provides an enhanced integrated positioning method, comprising the steps of:

receiving a plurality of global positioning system satellite signals to derive vehicle position and velocity information and a plurality of global positioning system (GPS) raw measurements, including pseudorange, carrier phase, and Doppler shift;

sending the GPS raw measurements to a central navigation processor from a GPS processor;

receiving a plurality of inertial measurements including body angular rates and specific forces from an inertial measurement unit (IMU);

sending the inertial measurements from the IMU to an inertial navigation system (INS) processor of the central navigation processor for computing an inertial navigation solution which are position, velocity, acceleration, and attitude of a vehicle;

receiving a vehicle altitude measurement from a altitude measurement device;

blending an inertial navigation solution derived from the INS processor, the GPS raw measurements from the GPS processor and the vehicle altitude measurement from the altitude measurement device in a Kalman filter to derive a plurality of INS corrections and GPS corrections;

feeding back the INS corrections from the Kalman filter to the INS processor to correct the inertial navigation solution; and sending the inertial navigation solution from the INS processor to an I/O interface, so as to provide navigation data for an on-board avionics system.

Moreover, in order to process the above method, the present invention further provides an enhanced integrated vehicle positioning system, which comprises a global positioning system (GPS) processor for providing GPS measurements including pseudorange, carrier phase, and Doppler shift; an inertial measurement unit (IMU) for providing inertial measurements including body angular rates and specific forces; an altitude measurement device for providing vehicle altitude measurement above the mean sea level; a central navigation processor, which are connected with the GPS processor, the IMU and the altitude measurement device, comprising an inertial navigation system (INS) processor, a Kalman filter, and a carrier phase integer ambiguity resolution module; and an input/output (I/O) interface connected to the central navigation processor. In which, the GPS measurements are passed to the central navigation processor, the vehicle altitude measurement is passed to the Kalman filter, and the inertial measurements are inject into the inertial navigation system (INS) processor. An output of the INS processor, the vehicle altitude measurement and the GPS measurements are blended in the Kalman filter; an output of the Kalman filter is fed back to the INS processor to correct an INS navigation solution outputting from the central navigation processor to the I/O interface. The INS processor provides velocity and acceleration data injecting into a micro-processor of the GPS processor to aid code and carrier phase tracking of GPS satellite signals. An output of the micro-processor of the GPS processor, an output of the INS processor and an output of the Kalman filter are injected into the carrier phase integer ambiguity resolution module to fix global positioning system satellite signal carrier phase integer ambiguity number. The carrier phase integer ambiguity resolution module outputs carrier phase integer number into the Kalman filter to further improve positioning accuracy; and the INS processor outputs navigation data to the I/O interface.

BRIEF DESCRIPTION OF THE DRAWINGS

FIG. 4a-1 is a block diagram of the central integrated navigation processing according to the above first preferred embodiment of the present invention.

FIG. 4a-2 is a block diagram of the central integrated navigation processing according to the above first preferred embodiment of the present invention, illustrating a data fusion module.

FIG. 4b-1 is a block diagram of the central integrated navigation processing according to the above second preferred embodiment of the present invention.

FIG. 4b-2 is a block diagram of the central integrated navigation processing, including the global positioning system, the inertial sensor, and radar altimeter, according to the above second preferred embodiment of the present invention, illustrating a data fusion module.

FIG. 4c-1 is a block diagram of the central integrated navigation processing, including the global positioning system, the inertial sensor, and altitude measurement device, according to the above third preferred embodiment of the present invention.

FIG. 4c-2 is a block diagram of the central integrated navigation processing, including the global positioning system, the inertial sensor, and radar altimeter, according to the above third preferred embodiment of the present invention, illustrating a data fusion module.

DETAILED DESCRIPTION OF THE PREFERRED EMBODIMENTS

The present invention is an enhanced integrated positioning method and system with altitude measurement. This method can substantially solve the problems encountered in global positioning system-only and inertial navigation system-only, such as loss of global positioning satellite signal, sensibility to jamming and spoofing, inertial solution's drift over time, and poor accuracy of the vertical positioning data. The present invention also features with a kalman filter used for blending the measurements from a global positioning system receiving set, an inertial sensor, and altitude measurement device, such as a radar altimeter. The present invention further features with a robust kalman filter used for blending the measurements from a global positioning system receiving set, an inertial sensor, and altitude measurement device, such as a radar altimeter. This method can substantially solve the problem of instability present in conventional systems where a kalman filter is used to perform optimal estimation.

The present invention supports high precision navigation in general aviation and space applications. It also supports high precision approach and landing for aircraft, reusable launch vehicles, and other air transportation vehicles. It can be tailored for ground motion vehicles tracking and navigation applications where an altitude measurement device is not needed and not equipped.

Figure 1:
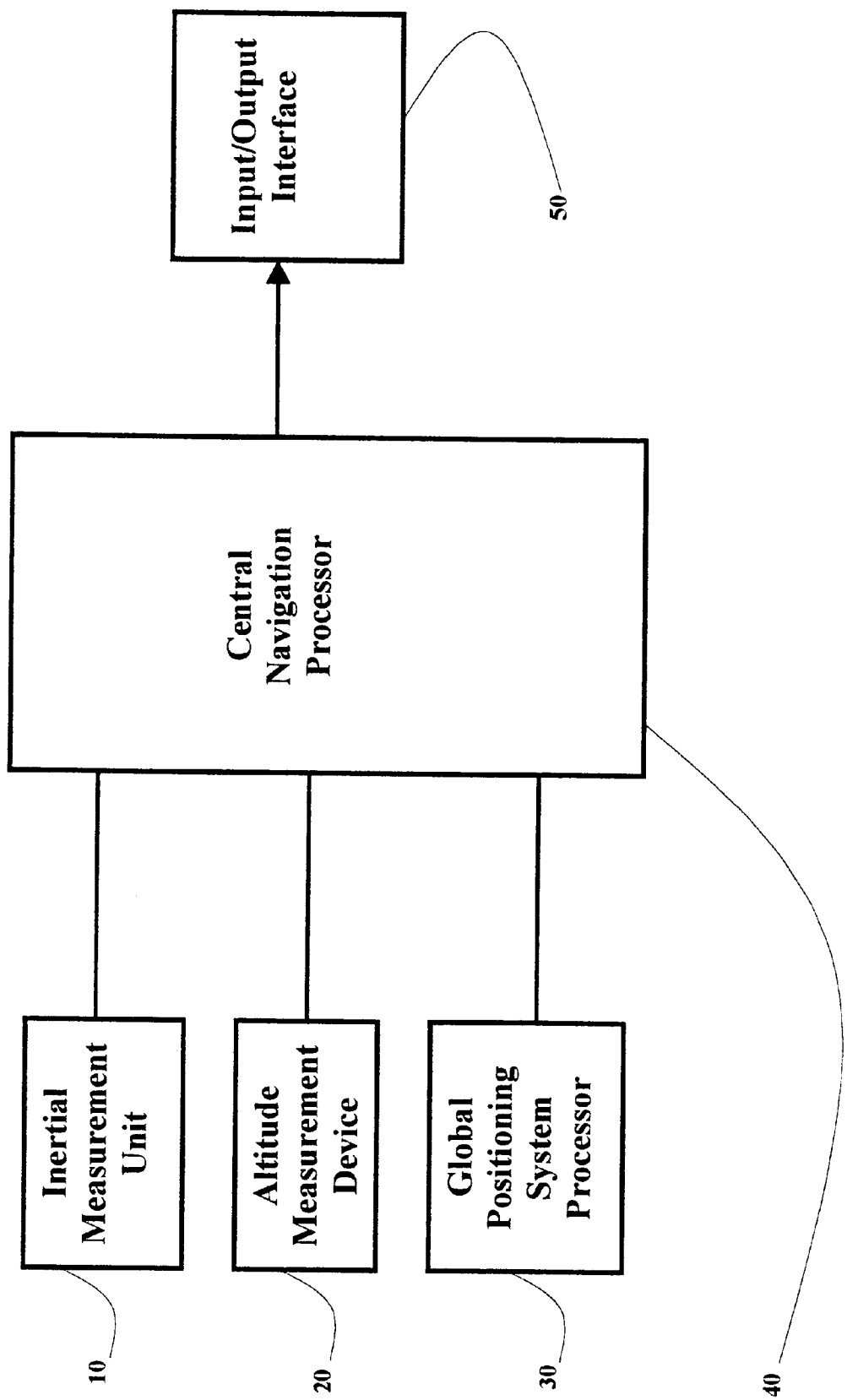
FIG. 1 is a block diagram illustrating an enhanced positioning method and system with altitude measurement according to the preferred invention, in which the inertial measurement, the altitude measurement, and the global positioning system measurement are blended in a central navigation processor.

Referring to FIG. 1, the enhanced global positioning system (GPS)/inertial measurement unit (IMU) positioning system with altitude measurement comprises an inertial measurement unit 10, an altitude measurement device 20, and a global positioning system processor 30 which are connected to a central navigation processor 40. The navigation solution is output to an input/output interface 50.

Referring to FIGS. 1, 2a, 3a, 4a-1, 4a-2, 5, 6, and 7, a first preferred embodiment of the present invention is illustrated. The enhanced positioning method of the present invention comprises the steps as follows:

1) Perform global positioning system (GPS) processing and receive GPS measurements which are pseudorange, carrier phase, and Doppler shift from a GPS processor 30 and pass them to a central navigation processor 40.

2) Receive inertial measurements which are body angular rates and specific forces from an inertial measurement unit 10 and inject them into an inertial navigation system (INS) processor 41 (FIGS. 4a-1 and 4a-2) of the central navigation processor 40.

3) Receive the altitude measurement from an altitude measurement device 20 and pass it to the central navigation processor.

Figures 1, 4A:
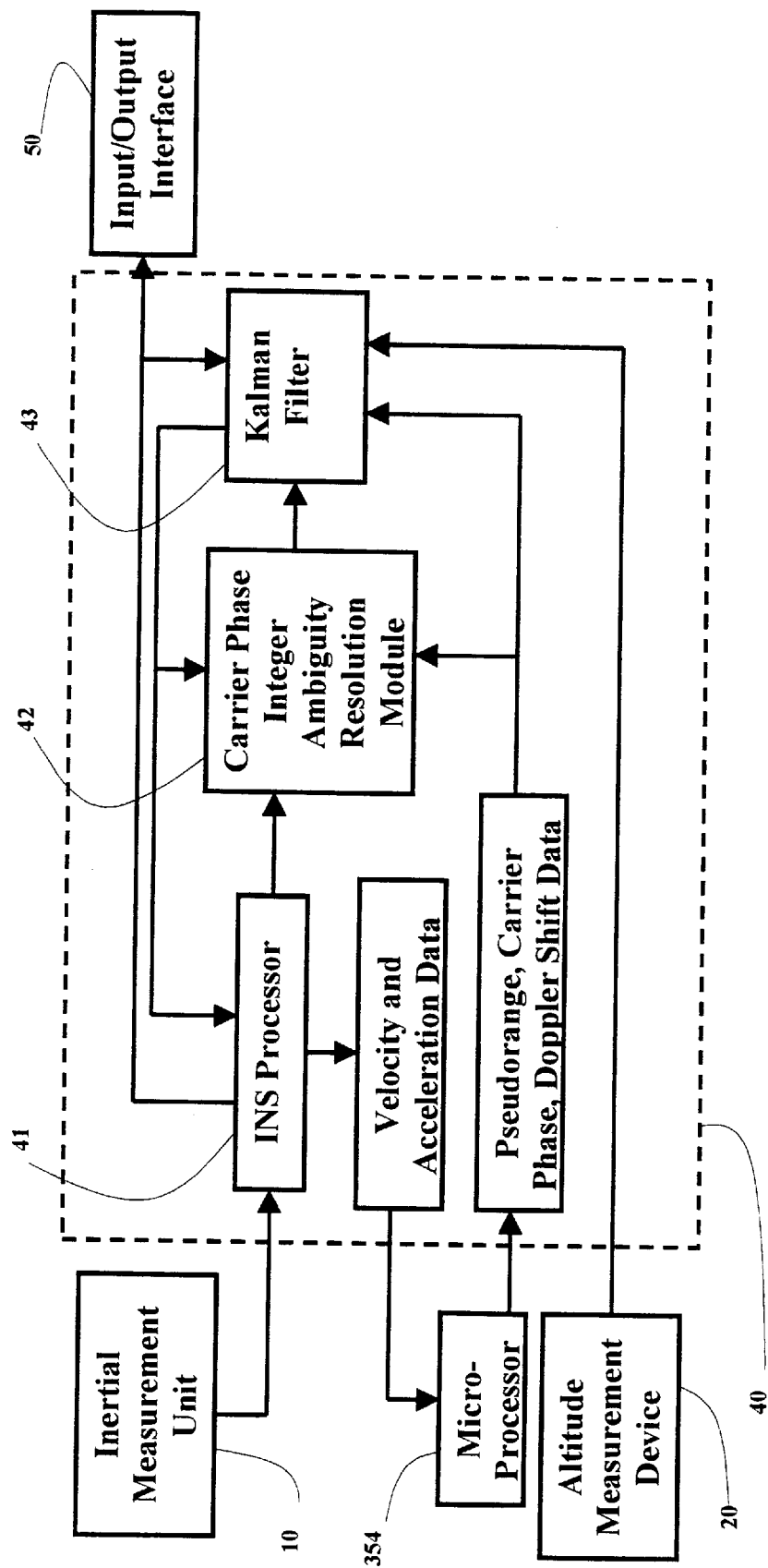
Figures 2, 4A:
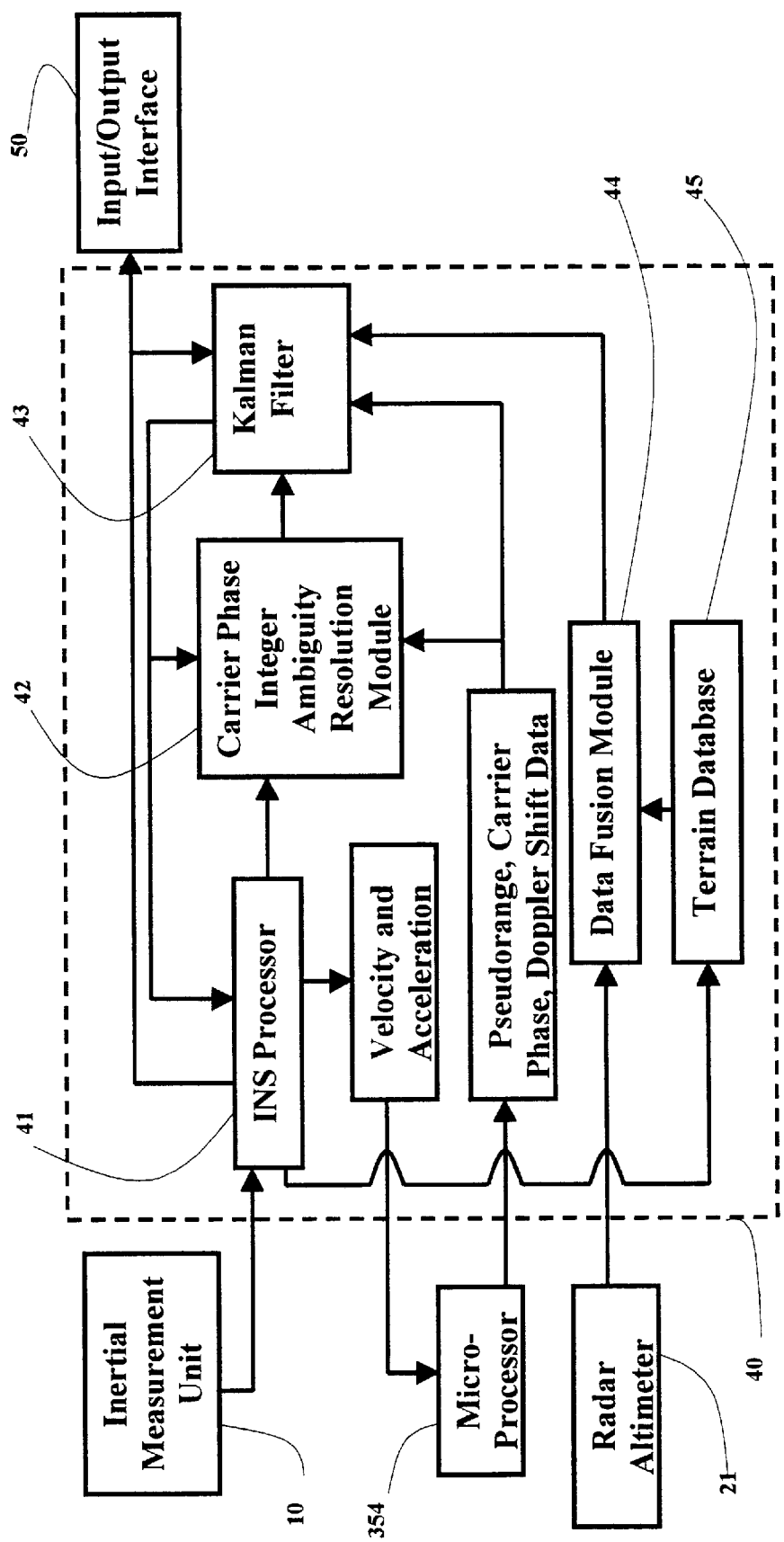

4) Blend the output of the INS processor 41, the altitude measurement, and the GPS measurements in a kalman filter 43 (FIGS. 4a-1 and 4a-2).

5) Perform INS processing and feed back the output of the kalman filter 43 to the INS processor 41 to correct the INS navigation solution.

6) Inject velocity and acceleration data from the INS processor 41 into a micro-processor 354 of the global positioning system processor 30 to aid the code and carrier phase tracking of the global positioning system satellite signals.

7) Inject the output of the micro-processor 354 of the global positioning system processor 30, the output of the INS processor 41, and the output of the kalman filter 43 into a carrier phase integer ambiguity resolution module 42 to fix the global positioning system satellite signal carrier phase integer ambiguity number.

8) Output the carrier phase integer number from the carrier phase integer ambiguity resolution module 42 into the kalman filter 43 to further improve the positioning accuracy.

9) Output the navigation data from the INS processor 41 to an input/output interface 50. Other on-board avionics systems can get navigation data from the input/output interface 50.

In step (1), the GPS satellites transmit the coarse acquisition (C/A) code and precision (P) code on radio frequency (RF) at L1 band:

$$S_{l1}(t) = \sqrt{2P_c} CA(t)D(t) \cos(\omega_1 t + \phi) + \sqrt{2P_p} P(t)D(t) \sin(\omega_1 t + \phi)$$

The GPS satellites transmit the precision (P) code on radio frequency (RF) at L2 band:

$$S_{l2}(t) = \sqrt{2P_2} P(t)D(t) \cos(\omega_2 t + \phi_2)$$

where, $\omega_1$ is the L1 radian carrier frequency, $\phi$ is a small phase noise and oscillator drift component, $P_c$ is the C/A signal power, $P_p$ is the P signal power, D(t) is the navigation data, CA(t) is the C/A code, P(t) is the P code, $\omega_2$ is the L2 radian carrier frequency, $P_2$ is the L2-P signal power, $\phi_2$ is a small phase noise and oscillator drift component.

Figure 2A:
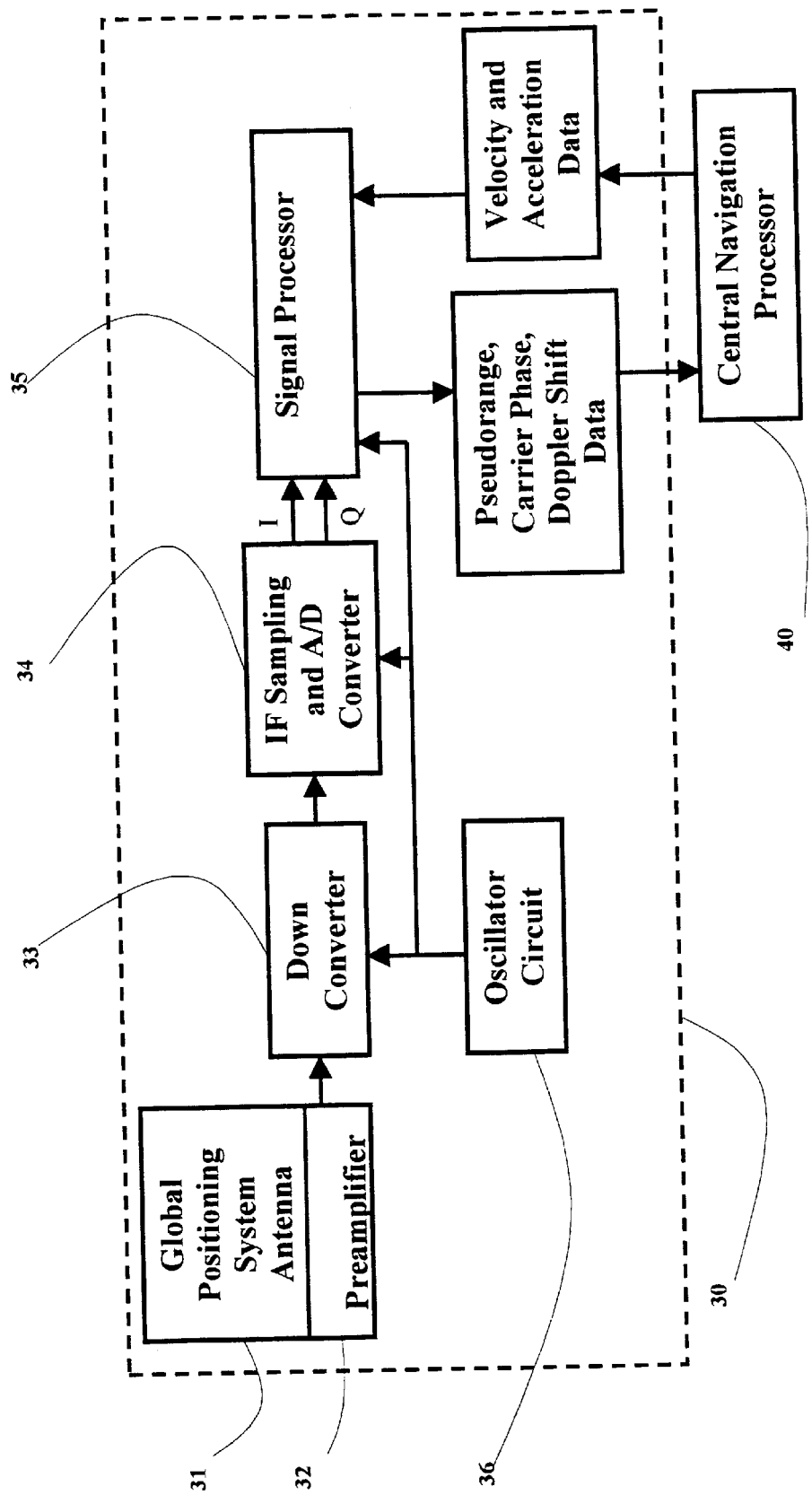
FIG. 2a is a block diagram of the global positioning system processing with external aiding from the central navigation processor according to a first preferred embodiment of the present invention.

In step (1), as shown in FIG. 2a, the received RF signals at the global positioning system antenna 31 are, respectively:

$$S_{l1}(t) = \sqrt{2P_c} CA(t-\pi)D(t) \cos[(\omega_1+\omega_d)t+\phi] + \sqrt{2P_p} P(t)D(t) \sin[(\omega_1+\omega_d)t+\phi]$$
$$S_{l2}(t) = \sqrt{2P_2} P(t-\pi)D(t) \cos[(\omega_2+\omega_d)t+\phi_2)]$$

where, $\pi$ is the code delay, $\omega_d$ is the Doppler radian frequency.

In step (1), as shown in FIG. 2a, the received GPS RF signals are amplified by a preamplifier circuit 32. The amplified GPS RF signals are then passed to a down converter 33 of the GPS processor 30. The down converter 33 converts the amplified radio frequency (RF) signal to intermediate frequency (IF) signal. The IF signal is processed by an IF sampling and A/D converter 34 to convert the IF signal to that of in-phase (I) and quadraphase (Q) components of the signal envelope. In the IF sampling and A/D converter 34, the IF signal which is analog signal, is first filtered by a low pass filter, and then sampled, finally converted from the analog signal to digital data (A/D). The digital data are input into a signal processor 35 to extract the navigation data modulated on the GPS signal, such as the GPS satellite ephemeris, atmosphere parameters, satellite clock parameter, and time information. The signal processor 35 also processes the digital data from the IF sampling and A/D converter 34 to derive the pseudorange, carrier phase, and Doppler frequency shift. In global positioning system processor 30, an oscillator circuit 36 provides the clock signal to the down converter 33, IF sampling and A/D converter 34, and the signal processor 35.

Referring to FIG. 2a, in step (1) the signal processor 35 outputs the GPS measurements, which are pseudorange, carrier phase, and Doppler shift, to the central navigation processor 40. In step (6), the signal processor 35 receives the velocity and acceleration information from the central navigation processor 40 to perform external velocity-acceleration aiding code and carrier phase tracking.

Figure 3A:
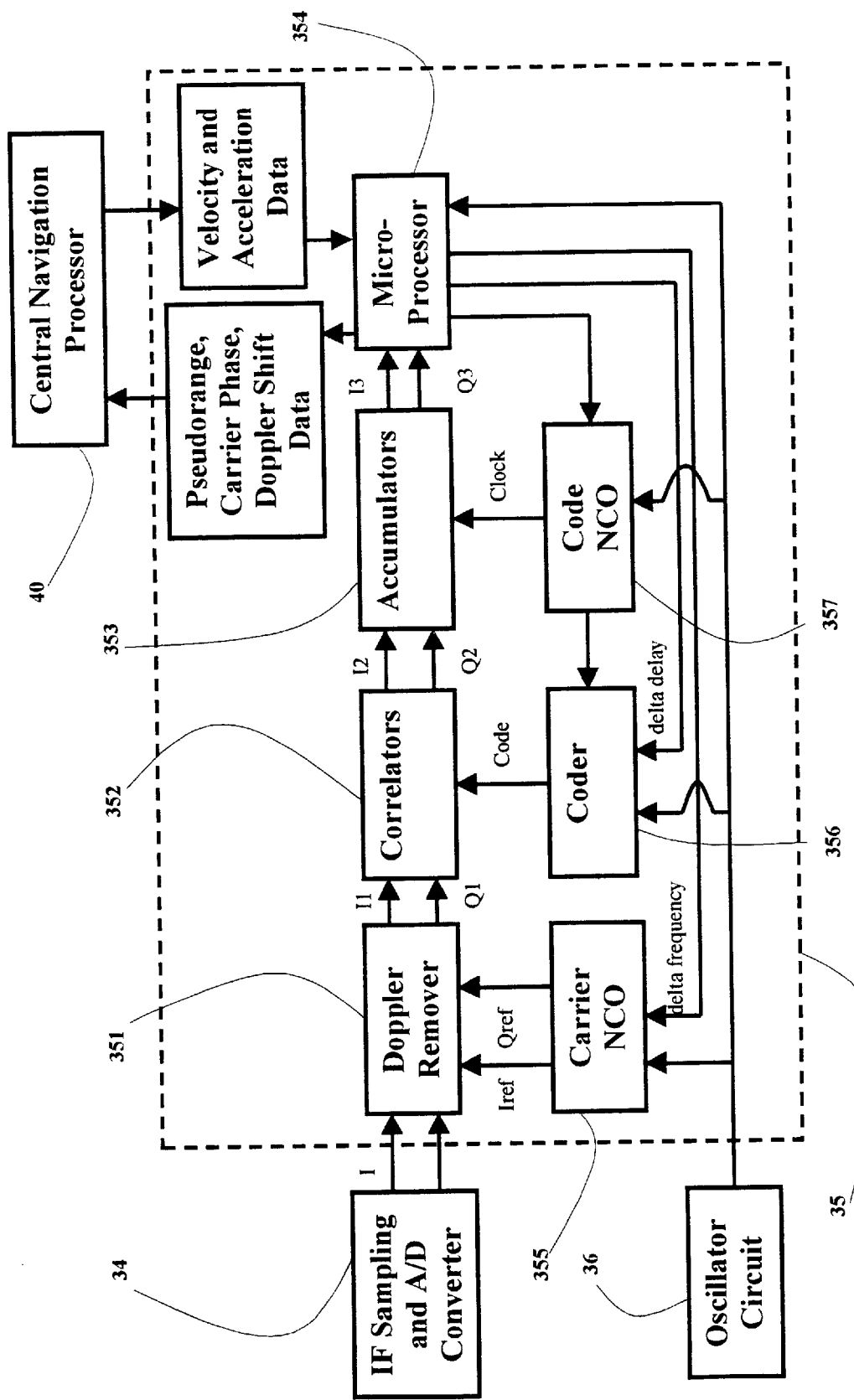
FIG. 3a is a block diagram of the global positioning system signal processing with external aiding from the central navigation processor according to the above first preferred embodiment of the present invention.

Referring to FIG. 3a, in step (1) the pseudorange measurements are derived from the GPS code tracking loop which consists of a correlators 352, an accumulators 353, a micro-processor 354, a code NCO (numerical controlled oscillator) 357, and a coder 356. The Doppler shift and carrier phase measurements are obtained from the GPS satellite signal carrier phase tracking loop which consists of a Doppler removal 351, a correlators 352, an accumulators 353, a micro-processor 354, and a carrier NCO (numerical controlled oscillator) 355.

Referring to FIG. 3a, in step (1) the digital data (I and Q) from the IF sampling and A/D converter 34 is processed by a Doppler remover 351 to remove the Doppler shift modulated on the GPS satellite signal. The Doppler remover 351 is used by the carrier tracking loop to track the phase and frequency of the incoming signal. The Doppler removal is accomplished with a digital implementation of a single sideband modulator. Carrier NCO (numerical controlled oscillator) 355 accumulates phase at its clocking rate based upon a frequency number input. Every time its accumulator rolls over, a new cycle is generated. The time that it takes to do this is a cycle period. The clock from the oscillator circuit 36 and the delta frequency from the micro-processor 354 drive the carrier NCO 355. The carrier NCO 355 outputs in-phase and quadraphase components of reference phase (Iref and Qref). The reference phase is output to the Doppler remover 351.

Referring to FIG. 3a, in step (1) the GPS satellite signal after Doppler removal processing is passed to a correlators 352 in which the correlation process is performed. An accumulators 353 follows the correlators 352 which makes up the postcorrelation processing and filters the correlated signal components (I2 and Q2) prior to processing in the microprocessor. The accumulation process is simply the accumulation of the correlated samples over T seconds, where T is usually a C/A code epoch periods of one ms. The accumulations (I3 and Q3) are stored and collected by the microprocessor 354, and the accumulators 353 are dumped, resulting in an accumulated-an-dump filtering of the signal components.

Referring to FIG. 3a, in step (1) the code used in the correlators 352 comes from a coder 356 which is driven by the clock from the oscillator 36 and the delta delay from the microprocessor 354. The coder 356 is responsible for generation of C/A code and/or P code. The accumulators 353 is driven by the clock generated from a code NCO 357 which is driven by the oscillator 36 and microprocessor 354. The code NCO 357 also drives the coder 356.

Referring to FIG. 3a, in step (6) the microprocessor 354 receives data from the accumulators 353 and the velocity and acceleration data from navigation processor 40 to perform loop filtering acquisition processing, lock detection, data recovery, and measurement processing. This working mode is referred to as velocity-acceleration aiding carrier phase and code tracking. In step (1), the microprocessor 354 output the GPS measurements, which are pseudorange, carrier phase, and Doppler shift, to the central navigation processor 40.

Referring to FIG. 3a, in step (1), when the tracking error of GPS signal in the signal tracking loop of the signal processor 35 is larger than the tracking bandwidth of the signal tracking loop, the loss of GPS satellite signal occurs. A loss of lock status of the tracking loop is mainly caused by the low signal-noise ratio (SNR) and Doppler drift of the received satellite signals. The former may be generated by inputting noise or jamming. The latter, Doppler drift, is caused by high-speed movement of the vehicle. Generally, the expansion of the bandwidth of the tracking loop can improve the Phase-Locked Loop (PLL) tracking capability in a high dynamic environment but simultaneously can corrupt anti-interference capability of the GPS receiving set because more unwanted noise signals are allowed to enter the GPS signal tracking loops. The aiding of GPS signals with corrected INS (inertial navigation system) solution is to obtain an optimal trade-off between GPS tracking loop bandwidth and anti-jamming capabilities.

Referring to FIG. 3a, in step (6) the purpose of the corrected INS velocity-acceleration information aided GPS PLL loop is to estimate the carrier phase of the intermediate frequency signal $\theta_I(t)$ rapidly and accurately over a sufficiently short estimation period, and $\theta_I(t)$ is approximated by $$\theta_I(t) = \theta_{I0} + \omega_{I0} t + \gamma_{I0} t^2 + \delta_{I0} t^3 + \ldots$$

The problem herein becomes to estimate the parameters of the above equation. The velocity-acceleration information, which describes the flight vehicle dynamic characteristics, is translated into the line-of-sight (LOS) velocity-acceleration information. Therefore, the estimate of the carrier phase of the intermediate frequency signal can be formulated by LOS velocity-acceleration values as follows:

$$\hat{\theta}(t) = b_1 V^{LOS} t + b_2 A^{LOS} t^2 + b_3 a^{LOS} t^3 + \Lambda$$

where $(b_1, b_2, b_3)$ are constants related to the carrier frequency and the speed of light, and are given by $$b_1 = \frac{4\pi f_c}{c},\ b_2 = \frac{2\pi f_c}{c},\ b_3 = \frac{4\pi f_c}{3c}$$

$V^{LOS}, A^{LOS}$ and $a^{LOS}$ correspond to the range rate, the range acceleration and the range acceleration rate along the LOS between the satellites and the receiver. Therefore, the tracking and anti-interference capabilities of the aided PLL loop seriously depend on the accuracy of $V^{LOS}$ and $A^{LOS}$ estimation. The $V^{LOS}$ and $A^{LOS}$ can be calculated from the information of velocity and acceleration coming from the INS processor 41 and then be incorporated into the loop filter in the microprocessor 354.

Referring to FIG. 3a, in step (1) the code tracking loop of the signal processing 35 tracks the code phase of the incoming direct sequence spread-spectrum signal. The code tracking loop provides an estimate of the magnitude of time shift required to maximize the correlation between the incoming signal and the internally generated punctual code. This information of time delay is used by the microprocessor 354 to calculate an initial vehicle-to-satellite range estimate, known as the pseudorange. In step (6), the information of velocity and acceleration coming from the central navigation processor 40 is transformed into the LOS velocity and acceleration ($V^{LOS}$ and $A^{LOS}$) which are used to precisely estimate the code delay. By this way, the dynamic performance and anti-jamming capability are enhanced.

It is well known that global positioning system has a poor accuracy of vertical positioning. The long term accuracy of global positioning and inertial navigation system integration solution is mainly dependent on the performance of the global positioning system. That means that the global positioning and inertial integrated navigation system can not improve the vertical positioning performance. In the present invention, an altitude measurement device is incorporated to mitigate this drawback.

The central navigation processor 40 is given in FIG. 4a-1 in which the measurements coming from the inertial measurement unit 10, the microprocessor 354 of global positioning system processor 30, and the altitude measurement device 20 are blended to derive high precision navigation information including 3 dimensional position, 3 dimensional velocity, and 3 dimensional attitude. These data are output from the INS processor 41 and are passed to the input/output interface 50. Other avionics systems can read the navigation data from this input/output interface 50. As mentioned before, the velocity and acceleration information is also fed back to the microprocessor 354 of the global positioning system processor 30 to aid the global positioning system satellite signal code and carrier phase tracking.

Referring to FIG. 4a-1, in step (2), the IMU measurements coming from an inertial measurement unit 10, which are body rates and specific forces, are collected by an INS processor to perform inertial navigation processing.

Referring to FIG. 4a-1, in step (3), the altitude measurement coming from an altitude measurement device 20 is collected by a kalman filter 43 to perform integrated filtering processing.

Referring to FIG. 4a-1, in step (4), the microprocessor 354 of the global positioning system processor 30 outputs the pseudornage, Doppler shifts, global positioning system satellite ephemeris, as well as atmosphere parameters to the kalman filter 43 in which the data from the INS processor 41, the altitude measurement device 20, the carrier phase integer ambiguity resolution module 42, and the microprocessor 354 of the global positioning system processor 30 are integrated to derive the position error, velocity error, and attitude error. In step (5), the INS processor 41 processes the inertial measurements, which are body angular rates and specific forces, and the position error, velocity error, and attitude error coming from the kalman filter 43 to derive the corrected navigation solution. The navigation solution includes 3-dimensional position, 3-dimensional velocity, and 3-dimensional attitude. These data are output into the kalman filter 43. On the other hand, in step (9), these data are also passed to the input/output interface 50 which provides a navigation data source for other avionics systems on board a vehicle where these avionics systems need navigation data or part of these data.

Referring to FIG. 4a-2, a radar altimeter 21 is a kind of altitude measurement device 20, which measures the altitude from the terrain to the vehicle which is called terrain altitude. FIG. 4a-2 gives the implementation of data integration processing using a radar altimeter. In step (4), the terrain altitude measured by a radar altimeter 21 is blended in a data fusion module 44 with the terrain elevation derived from the terrain database 45 to determine the altitude above the mean sea level (MSL). The altitude above the mean sea level is input into the kalman filter 43 and is used as one measurement in the measurement equation of the kalman filter 43.

Referring to FIG. 4a-2, in step (4), the microprocessor 354 of the global positioning system processor 30 outputs the pseudornage, Doppler shifts, global positioning system satellite ephemeris, as well as atmosphere parameters to the kalman filter 43 in which the data from the INS processor 41, the data fusion module 44, the carrier phase integer ambiguity resolution module 42, and the microprocessor 354 of the global positioning system processor 30 are integrated to derive the position error, velocity error, and attitude error. In step (5), the INS processor 41 processes the inertial measurements, which are body angular rates and specific forces, and the position error, velocity error, and attitude error coming from the kalman filter 43 to derive the corrected navigation solution. The navigation solution includes 3-dimensional position, 3-dimensional velocity, and 3-dimensional attitude. These data are output into the kalman filter 43. On the other hand, in step (9), these data are also passed to the input/output interface 50 which provides a navigation data source for other avionics systems on board a vehicle where these avionics systems need navigation data or part of these data.

Figure 5:
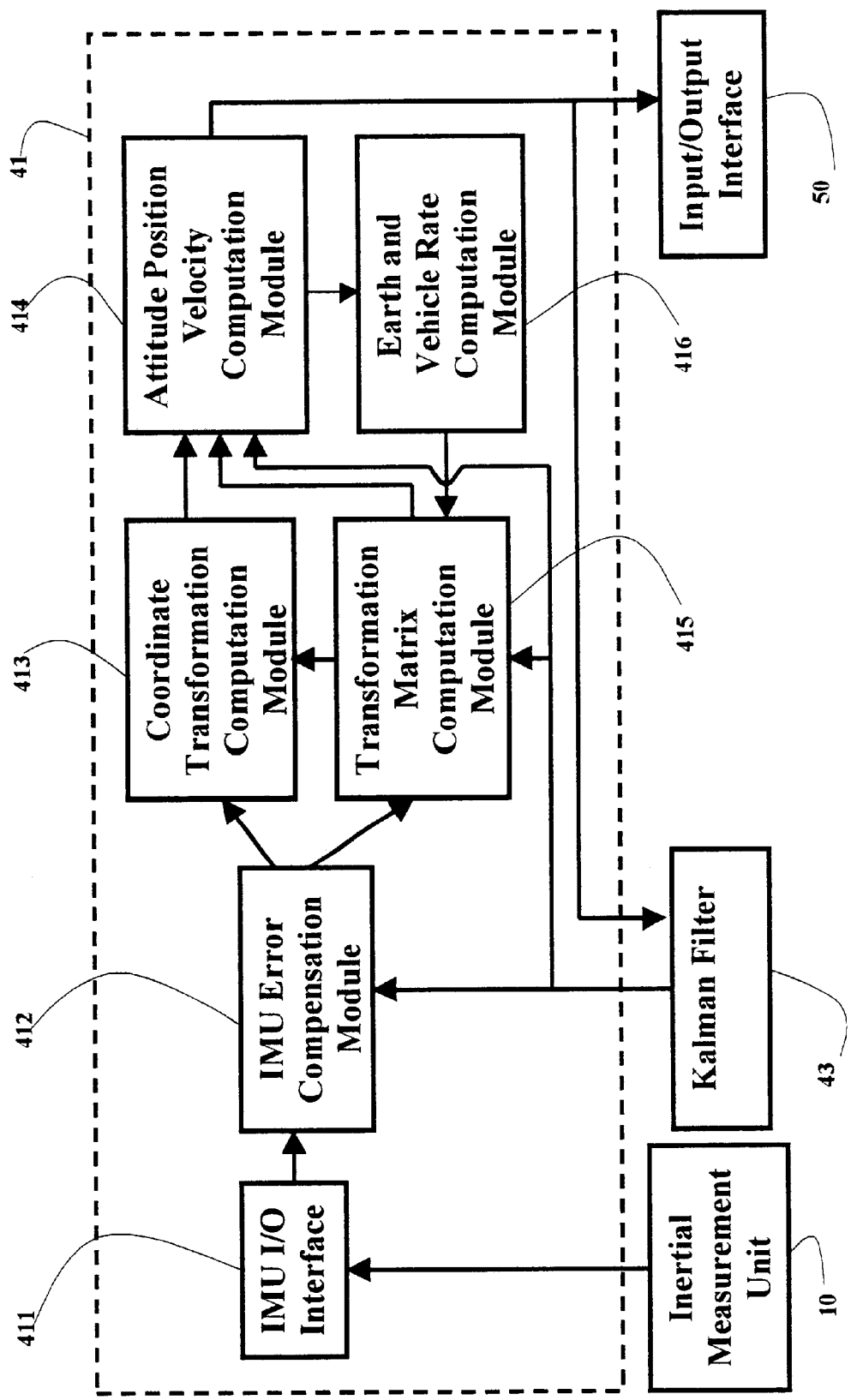
FIG. 5 is a block diagram of the inertial navigation system processing which receives the navigation state corrections from a kalman filter according to the above both preferred embodiment of the present invention.

As shown in FIG. 5, the INS processor 41 comprises an IMU I/O interface 411, an IMU error compensation module 412, a coordinate transformation computation module 413, an attitude position velocity computation module 414, a transformation matrix computation module 415, and an earth and vehicle rate computation module 416.

Referring to FIG. 5, in step (5), the IMU I/O interface 411 collects the signal of the body angular rates and specific forces from the inertial measurement unit 10, processes and converted it to digital data. These data are corrupted by the inertial sensor measurement errors. These contaminated data are passed to the IMU error compensation module 412. The IMU error compensation module 412 receives the sensor error estimates derived from the kalman filter 43 to perform EMU error mitigation on the digitized IMU data. The corrected inertial data are sent to coordinate transformation computation module 413 and transformation matrix computation module 415, where the body angular rates are sent to the transformation matrix computation module 415 and the specific forces are sent the coordinate transformation computation module 413.

Referring to FIG. 5, in step (5), the transformation matrix computation module 415 receives the body angular rates from the IMU error computation module 412 and the earth and vehicle rate from the earth and vehicle rate computation module 416 to perform transformation matrix computation. The transformation matrix computation module 415 sends the calculated transformation matrix to the coordinate transformation computation module 413 and attitude position velocity computation module 414. The attitude update algorithm in the transformation matrix computation module 415 uses the quatemion method because of its advantageous numerical and stability characteristics. The differential equation of the relative quaternion between the body frame and the local navigation frame is:

$$q\& = \frac{1}{2}[\Omega_b]q - \frac{1}{2}[\Omega_n]q$$

where, $q^T = [q_0 q_1 q_2 q_3]$ is a four-component vector of quaternion parameters, $\Omega_b$ is the skew-symmetric matrix of the vector. $\omega_{ib}^b$, which is sensed by the gyro and is the rotation rate vector of the body frame (b) relative to the inertial frame (i) in the body frame.

$$[\Omega_b] = \begin{bmatrix} 0 & -\omega_{bx} & -\omega_{by} & -\omega_{bz} \\ \omega_{bx} & 0 & \omega_{bz} & -\omega_{by} \\ \omega_{by} & -\omega_{bz} & 0 & \omega_{bx} \\ \omega_{bz} & \omega_{by} & -\omega_{bx} & 0 \end{bmatrix}, \omega_{ib}^b = [\omega_{bx}, \omega_{by}, \omega_{bz}]^T$$

$\Omega_n$ is the skew-symmetric matrix of the vector, $\omega_{in}^n$, which is the rotation rate vector of the local navigation frame (n) relative to the inertial frame in the navigation frame.

$$[\Omega_n] = \begin{bmatrix} 0 & -\omega_{nx} & -\omega_{ny} & -\omega_{nz} \\ \omega_{nx} & 0 & \omega_{nz} & -\omega_{ny} \\ \omega_{ny} & -\omega_{nz} & 0 & \omega_{nx} \\ \omega_{nz} & \omega_{ny} & -\omega_{nx} & 0 \end{bmatrix}, \omega_{in}^b = [\omega_{nx}, \omega_{ny}, \omega_{nz}]^T$$

If the navigation frame is the local, level North, East, and Down (NED) navigation frame, then:

$$\omega_{in}^n = \begin{bmatrix} (\omega_e + \lambda^\&)\cos L \\ -L^\& \\ -(\omega_e + \lambda^\&)\sin L \end{bmatrix}$$

where, $\omega_e$ is the Earth's rotation rate, L is the geodetic latitude, and $\lambda$ is the longitude.

Referring to FIG. 5, in step (5), the coordinate transformation module 413 collects the specific forces from the IMU error computation module 412 and the transformation matrix from the transformation matrix computation module 415 to perform the coordinate transformation. The coordinate transformation computation sends the specific forces transferred into the coordinate system presented by the transformation matrix to the attitude position velocity computation module 414.

Referring to FIG. 5, in step (5), the attitude position velocity computation module 414 receives the transformed specific forces from the coordinate transformation computation module 413 and the transformation matrix from the transformation matrix computation module 415 to perform the attitude, position, velocity update. A general navigation equation that describes the motion of a point mass over the surface of the Earth or near the Earth has the following form:

$$V^\&(t) = a - (2\omega_{ie} + \omega_{en}) \times V - \omega_{ie} \times \omega_{ie} \times r$$

where, a and V are the acceleration and velocity of the vehicle relative to the Earth in the navigation frame, $\omega_{ie}$ is the Earth rotation vector, $\omega_{en}$ is the angular rate of the navigation frame relative to the earth, r is the position vector of the vehicle with respect to the Earth's center.

Because the accelerometers do not distinguish between vehicle acceleration and the mass attraction gravity, the specific vector, $f$, sensed by the accelerometers is:

$$f = a - g(r)$$

where, g(r) is a combination of the earth's gravity and the centrifugal force at the vehicle location. Thus, $$V^\&(t) = f - (2\omega_{ie} + \omega_{en}) \times V + g(r)$$

where, $\omega_{ie}^n = \begin{bmatrix} \omega_e \cos L \\ 0 \\ -\omega_e \sin L \end{bmatrix}$, $\omega_{en}^n = \begin{bmatrix} \lambda^\& \cos L \\ -L^\& \\ -\lambda \sin L \end{bmatrix}$.

The vehicle velocity is updated by the following:

$$V^\&(t) = C_b^n f^b + M V^n + g^n$$

where, $C_b^n$ is the direction cosine matrix from the body frame to the navigation frame, and $$V^n = \begin{bmatrix} v_n \\ v_e \\ v_d \end{bmatrix}, f^b = \begin{bmatrix} f_{bx} \\ f_{by} \\ f_{bz} \end{bmatrix}, g^n = \begin{bmatrix} 0 \\ 0 \\ g_d \end{bmatrix},$$

$$M = \begin{bmatrix} 0 & -(2\omega_e + \lambda^\&)\sin L & L^\& \\ (2\omega_e + \lambda^\&)\sin L & 0 & (2\omega_e + \lambda^\&)\cos L \\ -L^\& & -(2\omega_e + \lambda^\&)\cos L & 0 \end{bmatrix}$$

Using the normal gravity formula for the WGS-84 ellipsoid results in the following expressions:

$$g_d = g_0 \left[ 1 - 2(1 + f + m)\frac{h}{a} + \left(\frac{5}{2}m - f\right)\sin^2 L \right]$$

$$(m = \omega_{ie}^2 a^2 b / GM)$$

where, $g_0$ is the gravity at the equator, $f$ is the elliptical flattening, h is the altitude, a is the semi-major axis value, b is the semi-minor axis value, GM is the earth's gravitational constant.

The differential equations for the position update of the geodetic latitude, L, longitude, $\lambda$, and height, h, are given by:

$$L^\& = \frac{V_n}{R_M + h}, \lambda^\& = \frac{V_e}{(R_N + h)\cos L}, h^\& = -v_d$$

where, $R_M$ is the radius of the curvature in the Meridian, $R_N$ is the radius of the prime vertical.

Referring to FIG. 5, in step (5), after the computation of the position and velocity, the position and velocity errors calculated by the kalman filter 43 are used in the attitude position velocity computation module 414 to correct the inertial solution. For the attitude correction, two methods can be applied. First approach is to send the attitude errors computed by the kalman filter 43 to the attitude position velocity computation module 414 to perform attitude correction in the attitude position velocity computation module 414. The second approach is to send the attitude errors computed by the kalman filter 43 to the transformation matrix computation module 415 to perform the attitude correction before the attitude position velocity computation module 414.

Referring to FIG. 5, in step (4), the corrected inertial solution obtained from the attitude position velocity computation module 414 is passed to the kalman filter 43 to construct the measurements of the kalman filter 43. Referring to FIGS. 4a-1 and 4a-2, in step (7), the corrected inertial navigation solution is also send to the carrier phase integer ambiguity resolution module 42 to aid the global positioning system satellite carrier phase integer ambiguity fixing. Referring to FIGS. 4a-1 and 4a-2, in step (6), the corrected velocity and accelerate is passed to microprocessor 354 of the GPS processor 30 to aid the global positioning system satellite signal carrier phase and code tracking. Referring to FIG. 5, in step (9), the attitude, position, and velocity information is send to the I/O interface 50 which provides a navigation data source for other avionics systems onboard a vehicle.

Referring to FIG. 5, in step (5), the attitude, position, and velocity computed by the attitude position velocity computation module 414 are sent to the earth and vehicle rate computation module 416 to calculate the Earth rotation and the vehicle rotation rate. The calculated Earth and vehicle rates are sent to the transformation matrix computation module 415.

It is well known that a kalman filter 43 produces optimal estimates with well defined statistical properties. The estimates are unbiased and they have minimum variance within the class of linear unbiased estimates. The quality of the estimates is however only guaranteed as long as the assumptions underlying the mathematical model hold. Any misspecification in the model may invalidate the results of filtering and thus also any conclusion based on them.

In the enhanced GPS/IMU positioning method and system with altitude measurement, an alternative mode of a kalman filter for position and attitude derivation is a robust kalman filter. This robust kalman filter is stable enough to operate in more than one dynamical environment. If the dynamics change drastically, or if a sensor failure occurs, for example, a GPS satellite signal failure or an inertial sensor signal failure, the filter must detect, rectify and isolate the failure situation.

The robust kalman filter has the characteristic that it provides near-optimum performance over a large class of process and measurement models. The pure kalman filter is not robust since it is optimal for only one particular process and measurement model. If the filter is not correct the filter covariance may report accuracy which is different from what can actually be achieved. The purpose of filter integrity is to ensure that the predicted performance from the error covariance is close to the actual estimation error statistics. In addition, filter divergence is usually caused by a changing process or measurement model or a sensor failure.

Figure 6:
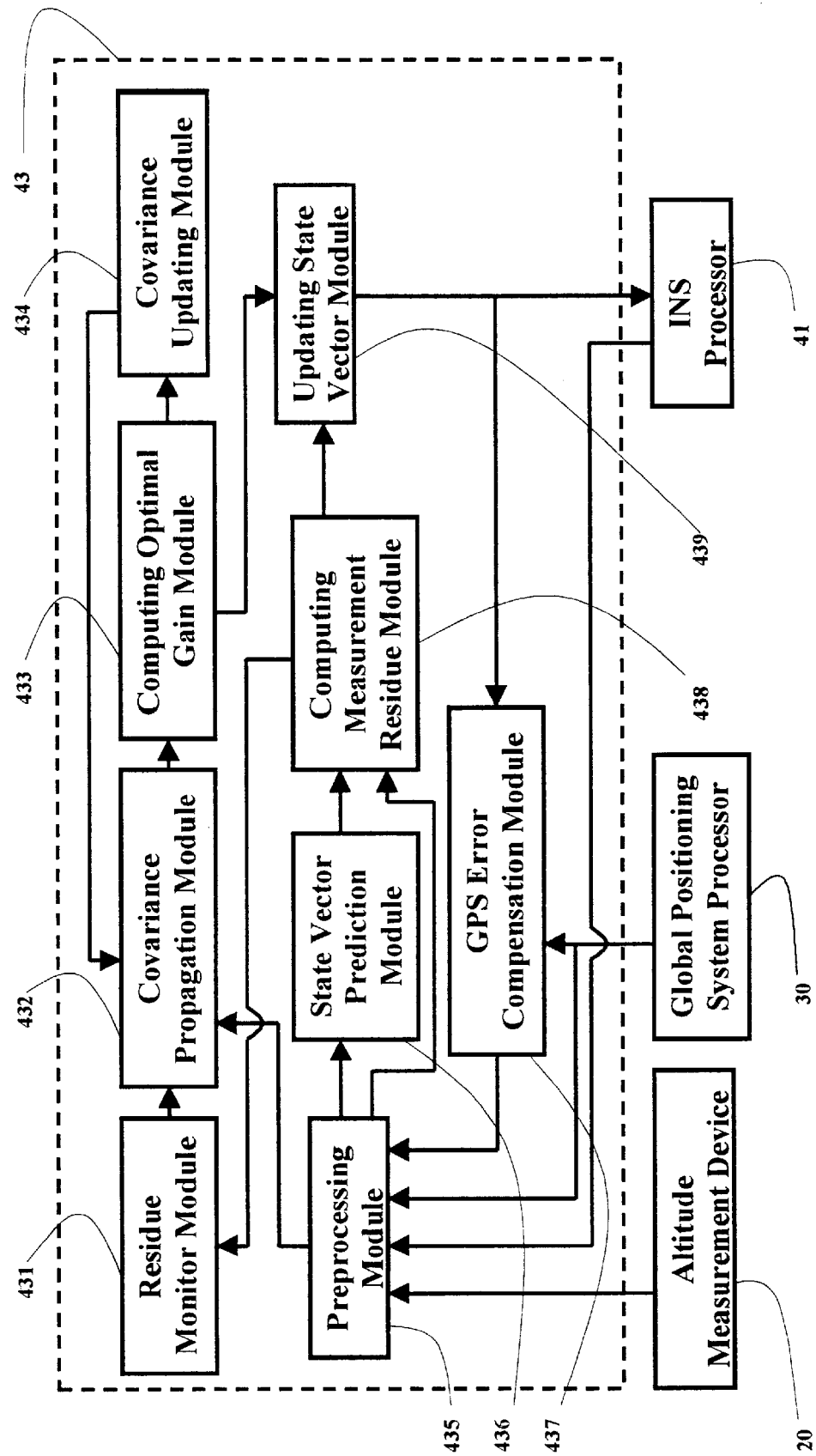
FIG. 6 is a block diagram of the robust kalman filter implementation according to the above both preferred embodiment of the present invention.

The present invention utilizes a residual monitoring method to obtain a robust kalman filter which is used to blend the global positioning system data, inertial sensor measurements, and the altitude measurement from an altitude measurement device. When the proper redundancy is available, residual monitoring schemes can efficiently detect hard and soft failures and filter divergence. One benefit of the residual monitoring approach is that when the filter model is correct, the statistical distribution of the residual sequence is known. Thus, it is easy to generate a measurement editing and divergence detection scheme using a test-of-distribution on the measurement residuals. The same statistics can be used to assess the filter tuning and adjust the size of the covariance when divergence is detected. FIG. 6 illustrates the implementation of the robust kalman filter including a residues monitor function.

Referring to FIG. 6, in step (4), a GPS error compensation module 437 gathers the GPS raw measurements including pseudorange, carrier phase, and Doppler frequency from the GPS processor 30, and the position and velocity corrections from a updating state vector module 439 to perform GPS error compensation. The corrected GPS raw data are sent to the preprocessing module 435.

Referring to FIG. 5, in step (4), a preprocessing module 435 receives the altitude measurement from the altitude measurement device 20, the GPS satellite ephemeris from the GPS processor 30, the corrected GPS raw data including pseudorange, carrier phase, and Doppler frequency from a GPS error compensation module 437, and INS solutions from the INS processor 41. The preprocessing module 435 performs the calculation of the state transit matrix and sends it as well as the previous state vector to a state vector prediction module 436. The calculated state transit matrix is also sent to a covariance propagation module 432. The preprocessing module 435 calculates the measurement matrix and the current measurement vector according to the computed measurement matrix and the measurement model. The measurement matrix and the computed current measurement vector are passed to a computing measurement residue module 438.

Referring to FIG. 5, in step (4), the state vector prediction module 436 receives the state transit matrix and the previous state vector from the preprocessing module 435 to perform state prediction of current epoch. The predicted current state vector is passed to the computing measurement residue module 438.

Referring to FIG. 5, in step (4), the computing measurement residue module 438 receives the predicted current state vector from the state vector prediction module 436 and the measurement matrix and the current measurement vector from the preprocessing module 435. The computing measurement residue module 438 calculate the measurement residues by subtracting the multiplication of the measurement matrix and the predicted current state vector from the current measurement vector. The measurement residues are sent to a residue monitor module 431 as well as the updating state vector module 439.

Referring to FIG. 5, in step (4), the residue monitor module 431 performs a discrimination on the measurement residues received from the computing measurement residue module 438. The discrimination law is whether the square of the measurement residues divided by the residual variance is larger than a given threshold. If the square of the measurement residues divided by the residual variance is larger than this given threshold, the current measurement may leads to the divergence of the kalman filter. When it occurs, the residue monitor module 431 calculates a new covariance of system process or rejects the current measurement. If the square of the measurement residues divided by the residual variance is less than this given threshold, the current measurement can be used by the kalman filter without changing current covariance of system process to obtain the current navigation solution. The covariance of system process is sent to the covariance propagation module 432.

Referring to FIG. 5, in step (4), the covariance propagation module 432 gathers the covariance of system process from the residue monitor module 431, the state transit matrix from the preprocessing module 435, and the previous covariance of estimated error to calculate the current covariance of the estimated error. The computed current covariance of the estimated error is sent to a computing optimal gain module 433.

Referring to FIG. 5, in step (4), the computing optimal gain module 433 receives the current covariance of the estimated error from the covariance computing module 432 to compute the optimal gain. This optimal gain is passed to a covariance updating module 434 as well as the updating state vector module 439. The covariance updating module 434 updates the covariance of the estimated error and sends it to the covariance propagation module 432.

Referring to FIG. 5, in step (4), the updating state vector receives the optimal gain from the computing optimal gain module 433 and the measurement residues from the computing measurement residue module 438. The updating state vector calculates the current estimate of state vector including position, velocity and attitude errors and sends them to the GPS error compensation module 437 and the INS processor 41.

As well known, more accurate positioning with GPS is obtained by use of carrier phase measurement than by use of pseudorange measurements only. This is because at the global positioning system satellite L1 broadcasting frequency, 1575.42 MHz, one cycle of carrier is only 19 centimeters as compared to that of one cycle of the C/A code which is around 300 meters. The high accuracy of positioning with GPS carrier phase measurement is based on the prior condition that the phase ambiguities have been solved. The ambiguity inherent with phase measurements depends upon both the global positioning system receiver and the satellite. Under the ideal assumptions of no carrier phase tracking error and the known true locations of the receiver and satellite, the ambiguity can be resolved instantaneously through a simple math computation. However, there is the presence of satellite ephemeris error, satellite clock bias, atmospheric propagation delay, mutipath effect, receiver clock error and receiver noise in range measurements from GPS code tracking loop, we can only get a non-precise geometric distance from the receiver to the satellite which is called a code pseudorange.

The advantage of the IMU aiding phase ambiguity resolution and cycle slip detection is that the precision vehicle coordinates and velocity from the corrected INS solution are available to aid in determining the original ambiguities and the search volume. Additionally, the INS aiding signal tracking enhances the receiver's capability to hold the global positioning system satellite signal, thus the probability of signal loss or cycle slip are reduced.

Referring to FIGS. 4a-1 and 4a-2, in step (7), the carrier phase integer ambiguity resolution module 42 collects the position and velocity data from the INS processor 41, the carrier phase and Doppler shift measurement from the microprocessor 354 of the global positioning system processor 30, and the covariance matrix from the kalman filter 43 to fix the global positioning system satellite signal integer ambiguity number. After fixing of carrier phase ambiguities, in step (8), the carrier phase ambiguity number is passed to the kalman filter 43 to further improve the measurement accuracy of the global positioning system raw data.

Figure 7:
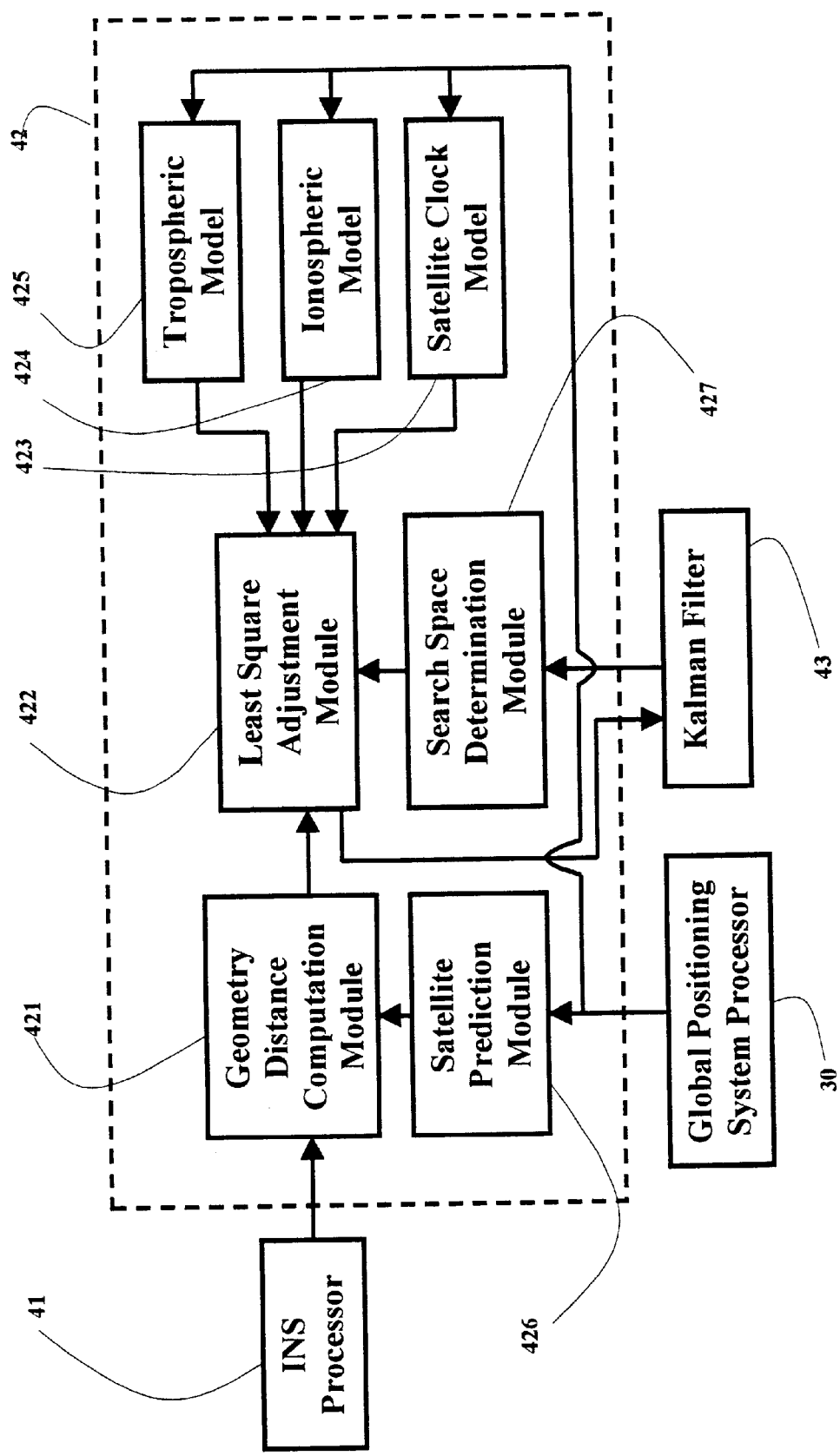
FIG. 7 is a block diagram of the global positioning system satellite signal carrier phase ambiguity resolution with aiding of inertial navigation system according to the above first preferred embodiment of the present invention.

Referring to FIG. 7, the IMU aiding global positioning system satellite signal carrier phase integer ambiguity resolution 42 comprises a geometry distance computation module 421, a least square adjustment module 422, a satellite clock model 423, an ionospheric model 424, a tropospheric model 425, a satellite prediction module 426, and a search space determination module 427.

A basic feature of global positioning system satellite signal carrier phase ambiguity is that there is no time dependency as long as tracking is maintained without interruption. The carrier phase measurement can be represented as:

$$\Phi = \frac{1}{\lambda}\rho + f\Delta\delta + N + \frac{d_{eph}}{\lambda} - \frac{d_{iono}}{\lambda} + \frac{d_{trop}}{\lambda} + \varepsilon$$

where, $\Phi$ is the measured carrier phase, $\lambda$ is the signal wavelength; $\rho$ is the true geometric distance between the receiver and satellite; $f$ is the signal frequency; $\Delta\delta = \delta^S - \delta_R$ is the clock error, $\delta^S$ is the satellite clock bias, $\delta_R$ is the receiver error; N is the carrier phase integer ambiguity; $d_{eph}$ is the range error induced by ephemeris error; $d_{iono}$ is the propagation error induced by ionosphere; $d_{trop}$ is the propagation error induced by troposphere; $\epsilon$ is the phase noise.

When dual frequency is available (using an L1 and L2 dual frequency global positioning system receiver), the dual frequency carrier phase measurements can be used to cancel almost all of the ionospheric error which is the main error source for range measurement. Furthermore, the IMU aiding carrier phase ambiguity resolution is also applied to the wide-lane signal formed between the dual frequency carrier phase measurements. The wide-lane signal can be expressed as $$\Phi_w = \Phi_{L1} - \Phi_{L2}$$

where, $\Phi_{L1}$ is the L1 channel carrier phase measurement; $\Phi_{L2}$ is the L2 channel carrier phase measurement. The corresponding wide-lane frequency and phase ambiguity are $f_w = f_{L1} - f_{L2}$, $N_w = N_{L1} - N_{L2}$.

The problem of fixing carrier phase ambiguity is further complicated by the need to re-determine the ambiguities every time when lock to satellite is lost (this phenomenon is called a cycle slip). The cycle slip must be detected and repaired to maintain high precision navigation solutions. Three sources for cycle slips can be distinguished. First, cycle slips are caused by obstructions of the satellite signal due to trees, buildings, bridges, mountains, etc. This source is the most frequent one. The second source for cycle slips is a low signal-to-noise ratio (SNR) due to bad ionospheric conditions, multipath, high receiver dynamics, or low satellite elevation. A third source is the receiver oscillator. In this present invention, the IMU aiding is also used for the cycle slip detection and repairing.

Referring to FIG. 6, in step (7), the satellite prediction module 426 collects the ephemeris of visible global positioning system satellites from the global positioning system processor 30 to perform satellite position calculation. The predicted satellite position is passed to the geometry distance computation module 421. The geometry distance computation module 421 receives the vehicle's precision position information from the INS processor 41. Based on the position information of the satellite and the vehicle, the geometrical distance between the satellite and the vehicle is computed by the geometry distance computation module 421 which is different from the pseudorange derived from the code tracking loop of the global positioning system processor 30. The resolved geometrical distance is sent to the least square adjustment module 422.

Referring to FIG. 7, in step (7), the tropospheric model 425 collects the time tag from the global positioning system processor 426 and calculates the tropospheric delay of the global positioning system satellite signal using the embedded tropospheric delay model. The calculated troposheric delay is sent to the least square adjustment module 422.

Referring to FIG. 7, in step (7), the ionospheric model 424 collects the time tag and the ionospheric parameters broadcast by the global positioning system satellite from the GPS processor 30. Using these ionospheric data and the embedded ionospheric delay model, the ionospheric model 424 calculates the minus time delay introduced by the ionosphere. The calculated ionospheric delay is sent to the least square adjustment module 422.

Referring to FIG. 7, in step (7), the satellite clock model 423 collects the global positioning system satellite clock parameters to perform the satellite clock correction calculation. The satellite clock correction is also sent to the least square adjustment module 422.

Referring to FIG. 7, in step (7), the search space determination module 427 receives the covariance matrix of the measurement vector from the kalman filter 43. Based on the covariance matrix, the search space determination module 427 derives the measurement error and determine the global positioning system satellite carrier phase integer ambiguity search space. The carrier phase ambiguity search space is sent to the least square adjustment module 422.

Referring to FIG. 7, in step (7), the least square adjustment module 422 gathers the geometrical distance from the vehicle to the global positioning system satellite from the geometry distance computation module 421, the tropospheric delay from the tropospheric model 425, the ionospheric delay from the ionospheric model 424, and the satellite clock correction from the satellite clock model 423 to calculate the initial search origin. The least square adjustment module 422 also receives the search space from the search space determination module 427. A standard least square adjustment algorithm applied to the initial search origin and the search space to fix the carrier phase ambiguity.

The first preferred embodiment of the present invention described above is referred as the enhanced fully-coupled global positioning system/inertial measurement unit positioning method and system with altitude measurement. This positioning method and system blends the global positioning system measurements of pseudorange, carrier phase, and Doppler shift with the inertial measurements as well as the altitude measurement in a kalman filter.

This integration mode requires carrier phase measurement from global positioning system which pose additional cost on the global positioning system processor to extract the satellite signal carrier phase. In the first preferred embodiment of present invention, the corrected inertial navigation solution, that is the velocity and acceleration, is fed back to the global positioning system processor to aid the carrier phase and code tracking of the global positioning system satellite signals. The corrected inertial navigation solution is also used to aid the global positioning system integer ambiguity resolution. In the first preferred embodiment of the present invention, the altitude measurement coming from an altitude measurement device is used to improve the vertical positioning accuracy. A radar altimeter is one kind of altitude measurement unit. The first preferred embodiment of the present invention utilizes a data fusion module and a terrain database to process the terrain height from a radar altimeter and then incorporates the altitude measurement into a kalman filter to blend it with the GPS measurements and INS solution.

The altitude measurement can also be applied to the tightly-coupled global positioning system/inertial measurement unit integrated system to improve the vertical accuracy. The second preferred embodiment of the present invention uses a kalman filter to blend the global positioning system measurements of pseudorange and Doppler shift, the inertial measurements, and the altitude measurement from an altitude measurement device. Different from the first preferred embodiment of the present invention, in this method, the global positioning system satellite signal carrier phase is not employed in integration mechanism.

Referring to FIGS. 1, 2b, 3b, 4b-1, 4b-2, 5, and 6, a second preferred embodiment of the present invention is illustrated. The second preferred embodiment of the present invention comprises the following steps:

1) Perform GPS processing and receive GPS measurements which are pseudorange and Doppler shift from a global positioning system processor 30 and pass them to a central navigation processor 40.

2) Receive inertial measurements which are body angular rates and specific forces from an inertial measurement unit 10 and inject them into an inertial navigation system (INS) processor 41 (FIGS. 4b-1 and 4b-2) of the central navigation processor 40.

3) Receive the altitude measurement from an altitude measurement device 20 and pass it to the central navigation processor 40.

Figures 1, 4B:
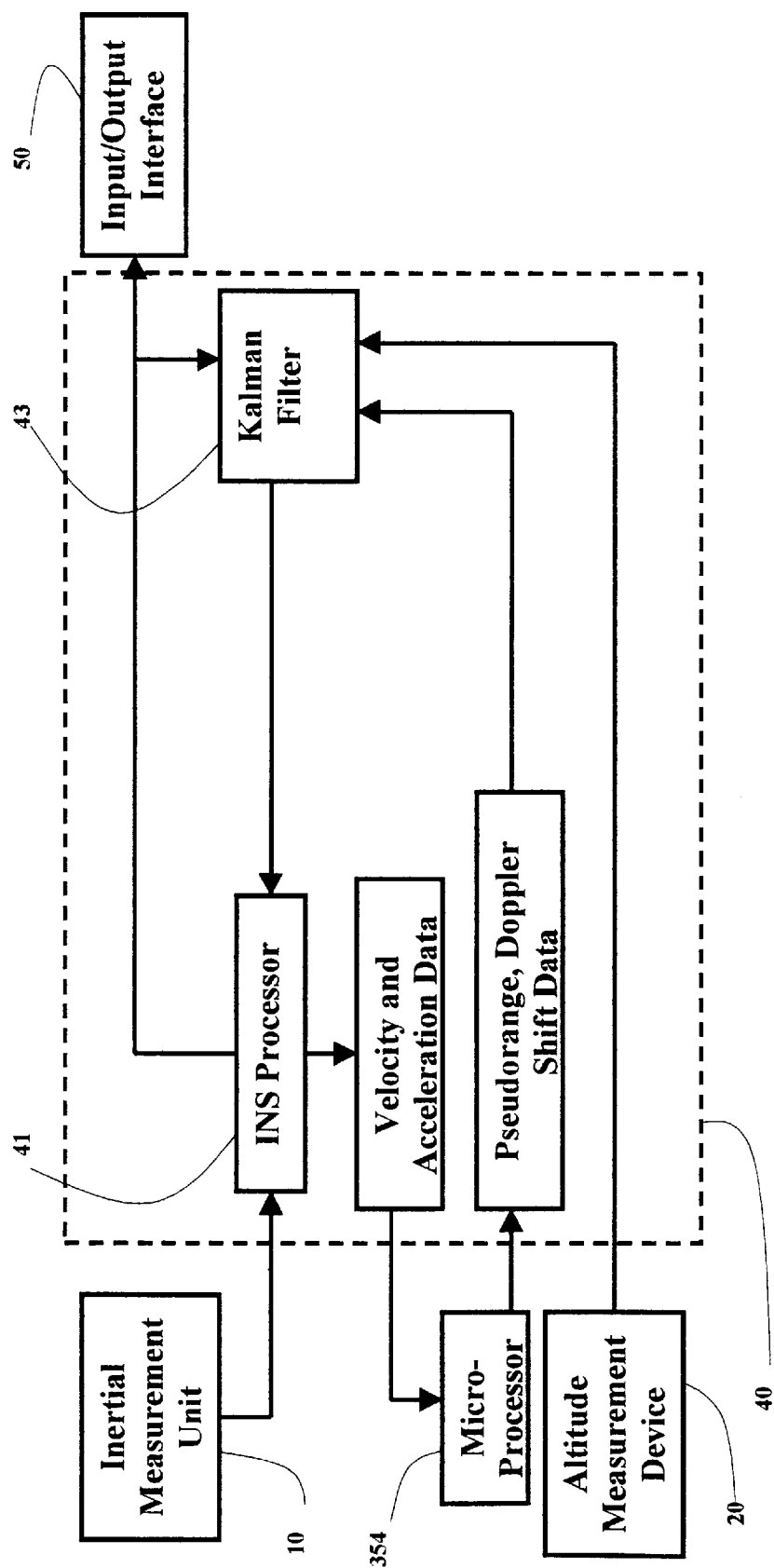
Figures 2, 4B:
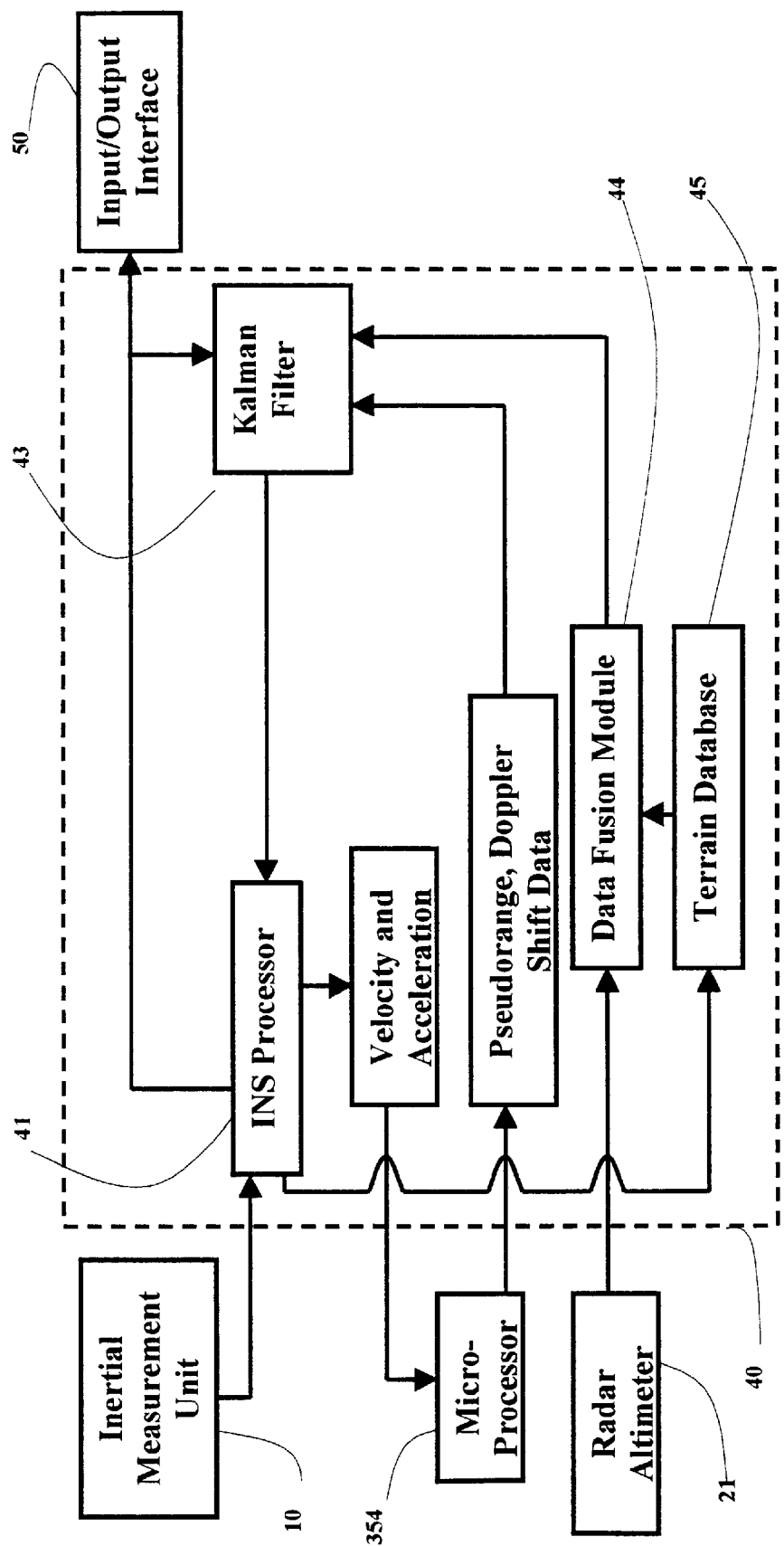

4) Blend the output of the INS processor 41, the altitude measurement, and the GPS measurements of pseudorange and Doppler shift in a kalman filter 43 (FIGS. 4b-1 and 4b-2).

5) Perform INS processing and feed back the output of the kalman filter 43 to the INS processor 41 to correct the INS navigation solution.

6) Output the navigation data from the INS processor 41 to the input/output interface 50. Other on-board avionics systems can get navigation data from the input/output interface 50.

Figure 3B:
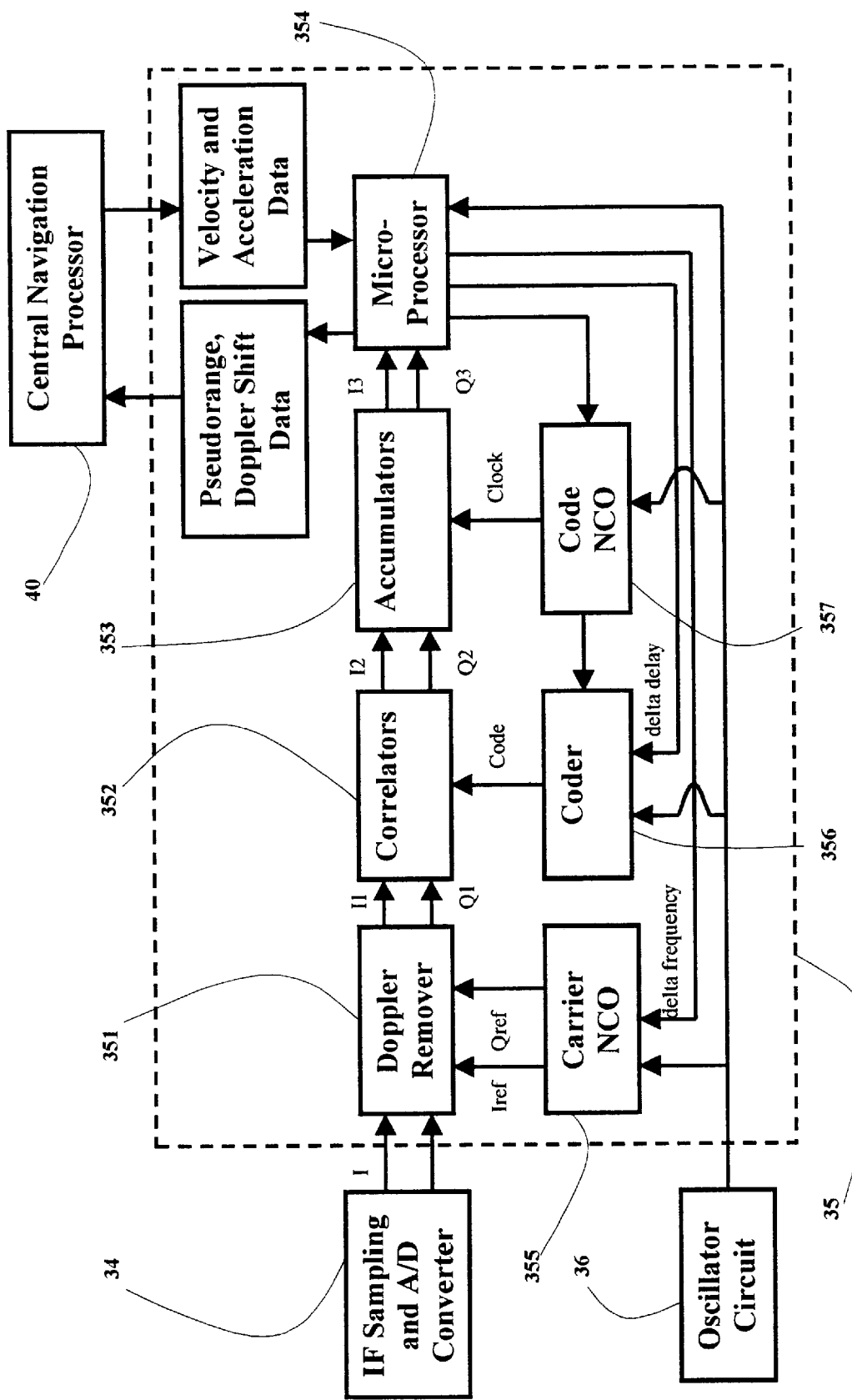
FIG. 3b is a block diagram of the global positioning system signal processing with external aiding from the central navigation processor according to the above second preferred embodiment of the present invention.

After step (5), an additional step can be added:

(5a) Inject velocity and acceleration data from the INS processor 41 into a micro-processor 354 of the global positioning system processor 30 to aid the code tracking of the global positioning system satellite signals, as shown in FIG. 3b.

Referring to FIGS. 2b, 3b, 4b-1, and 4b-2, in step (1) the second preferred embodiment of the present invention does the same thing as the first preferred embodiment of the present invention except carrier phase tracking and the velocity-acceleration aiding carrier phase tracking. The central navigation processor 40 receives only pseudorange and Doppler shift from the global positioning system processor 30, excluding the measurement of carrier phase.

Figure 2B:
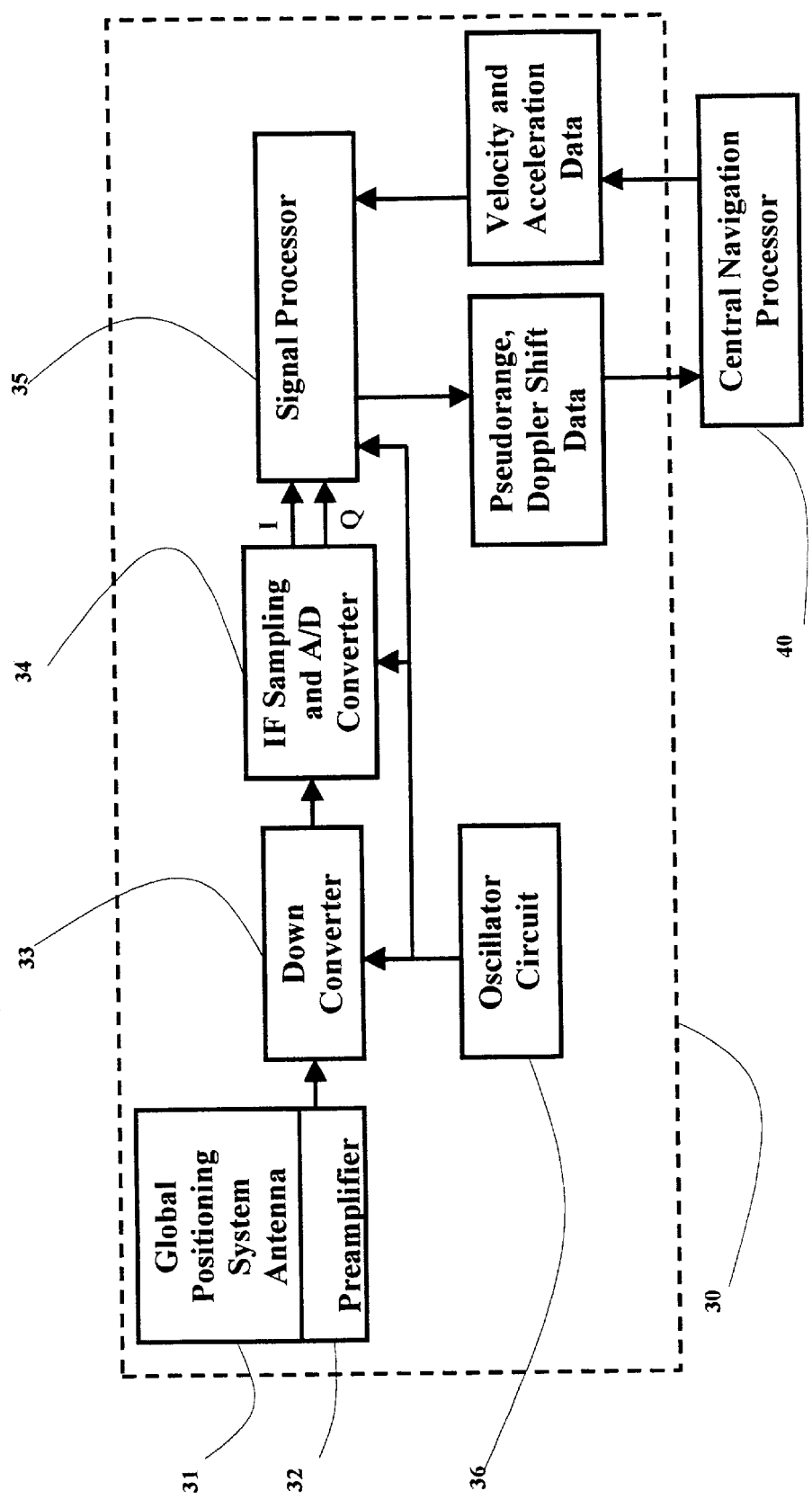
FIG. 2b is a block diagram of the global positioning system processing with external aiding from the central navigation processor according to a second preferred embodiment of the present invention.

Referring to FIG. 2b, in step (1), the global positioning system antenna 31, the preamplifier 32, the down converter 33, IF sampling and A/D converter 34, and the oscillator 36 do the same things as in the first preferred embodiment of the present invention, except the signal processor 35. The signal processor 35 receives the digitized data from the IF sampling and A/D converter 34 to extract the navigation data modulated on the GPS signal, such as the GPS satellite ephemeris, atmosphere parameters, satellite clock parameter, and time information. The signal processor 35 also processes the digital data from the IF sampling and A/D converter 34 to derive the pseudorange and Doppler shift. The extracted pseudorange and Doppler shift are sent to the central navigation processor 40. In step (5a), the signal processor 35 receives the velocity and acceleration from the central navigation processor 40 to perform code tracking aiding.

Referring to FIG. 3b, in step (1), the pseudorange measurements are derived from the GPS code tracking loop which consists of a correlators 352, an accumulators 353, a micro-processor 354, a code NCO (numerical controlled oscillator) 357, and a coder 356. The Doppler shift are obtained from the GPS satellite signal frequency tracking loop which is different from the carrier phase tracking loop in the first preferred embodiment of the present invention. The frequency tracking loop comprises a Doppler removal 351, a correlators 352, an accumulators 353, a microprocessor 354, and a carrier NCO (numerical controlled oscillator) 355, where the microprocessor 354 does not perform carrier phase detection.

Referring to FIG. 3b, in step (1), the Doppler remover 351, the correlators 352, the accumulators 353, the carrier NCO 355, the coder 356, and the code NCO 357 do the same things as that in the first preferred embodiment of the present invention. The microprocessor 354 does different work in the second preferred embodiment of the present invention.

Referring to FIG. 3b, in step (1), the accumulations (I3 and Q3) coming from the accumulators 353 are stored and collected by the microprocessor 354, and the accumulators 353 are dumped, resulting in an accumulated-an-dump filtering of the signal components. The microprocessor 354 performs code tracking loop filtering, code acquisition processing, code lock detection, data recovery, and pseudorange and Doppler shift processing. In step (5a), The microprocessor 354 receives the velocity and acceleration information from central navigation processor 40 to performs external aiding code tracking loop filtering, code acquisition processing, code lock detection, data recovery, and pseudorange and Doppler shift processing.

Referring to FIG. 3b, in step (1), the microprocessor 354 outputs the pseudorange and Doppler shifts to the central navigation processor 40.

Referring to FIGS. 4b-1 and 4b-2, in step (2), the inertial measurement unit 10 outputs the inertial measurements of body rates and specific forces to the INS processor 41. In step (3), the altitude measurement device measures the altitude and passes it the central navigation processor 40.

Referring to FIG. 4b-1, in step (4), the microprocessor 354 of the global positioning system processor 30 outputs the pseudornage, Doppler shifts, global positioning system satellite ephemeris, as well as atmosphere parameters to the kalman filter 43 in which the data from the INS processor 41, the altitude measurement device 20, and the microprocessor 354 of the global positioning system processor 30 are integrated to derive the position error, velocity error, and attitude error. In step (5), the INS processor 41 processes the inertial measurements, which are body angular rates and specific forces, and the position error, velocity error, and attitude error coming from the kalman filter 43 to derive the corrected navigation solution. The navigation solution includes 3-dimensional position, 3-dimensional velocity, and 3-dimensional attitude. These data are output into the kalman filter 43. On the other hand, in step (6), these data are also passed to the input/output interface 50 which provides a navigation data source for other avionics systems on board a vehicle where these avionics systems need navigation data or part of these data.

Referring to FIG. 4b-2, a radar altimeter 21 is a kind of altitude measurement device 20, which measures the altitude from the terrain to the vehicle which is called terrain altitude. FIG. 4b-2 gives the implementation of data integration processing using a radar altimeter in the second preferred embodiment of the present invention. In step (4), the terrain altitude measured by a radar altimeter 21 is blended in a data fusion module 44 with the terrain elevation derived from the terrain database 45 to determine the altitude above the mean sea level (MSL). The altitude above the mean sea level is input into the kalman filter 43 and is used as one measurement in the measurement equation of the kalman filter 43.

Referring to FIG. 4b-2, in step (4), the microprocessor 354 of the global positioning system processor 30 outputs the pseudornage, Doppler shifts, global positioning system satellite ephemeris, as well as atmosphere parameters to the kalman filter 43 in which the data from the INS processor 41, the data fusion module 44, and the microprocessor 354 of the global positioning system processor 30 are integrated to derive the position error, velocity error, and attitude error. In step (5), the INS processor 41 processes the inertial measurements, which are body angular rates and specific forces, and the position error, velocity error, and attitude error coming from the kalman filter 43 to derive the corrected navigation solution. The navigation solution includes 3-dimensional position, 3-dimensional velocity, and 3-dimensional attitude. These data are output into the kalman filter 43. On the other hand, in step (6), these data are also passed to the input/output interface 50 which provides a navigation data source for other avionics systems on board a vehicle where these avionics systems need navigation data or part of these data.

Referring to FIG. 5, in step (5), the INS processor 41 in the second preferred embodiment of the present invention do the same thing as that in the first preferred embodiment of the present invention.

Referring to FIG. 6, in step (4), the robust kalman filter in the second preferred embodiment of the present invention do the same thing as that in the first preferred embodiment of the present invention except the GPS error compensation module 437 of the kalman filter 43. The GPS error compensation module 437 gathers the GPS raw measurements of pseudorange and Doppler shift, excluding carrier phase, from the global positioning processor 30, and the position and velocity corrections from the updating state vector module 439 to perform GPS error compensation. The corrected GPS raw data of pseudorange and Doppler shift are sent to the preprocessing module 435.

The enhanced tightly-coupled global positioning system/inertial measurement unit integration method and system with altitude measurement uses a kalman filter processes the raw pseudorange and Doppler shift measurements of the global positioning system, the inertial solution, and the altitude measurement from a altitude measurement device to provide optimal navigation parameter error estimates of the inertial navigation system, inertial sensor errors, and the global positioning system receiver clock offset. These error estimates are used to correct the inertial navigation system to derive the integrated navigation solution. The incorporation of the altitude measurement improves the vertical positioning accuracy. The corrected inertial velocity and acceleration are fed back to the global positioning signal processor to aid the code tracking of the global positioning system satellite signals. This integration mode relaxes the requirement of carrier phase measurement for the global positioning system processor which reduces the cost of the integration system. The tightly-coupled integration mode has an accuracy less than the filly-coupled integration system, because it does not employ carrier phase in an integration solution which has higher measurement accuracy than code.

The loosely-coupled integration of global positioning system and inertial navigation system is the simplest integration mode which uses the global positioning system-derived position and velocity as the measurements in a kalman filter. This integration mode does not require a high speed integration processor and a sophisticated global positioning system processor. This leads to its advantage of cost-effectiveness.

The altitude measurement can also be applied to the loosely-coupled global positioning system/inertial measurement unit integrated system to improve the vertical accuracy which leads to the third preferred embodiment of the present invention. The third preferred embodiment of the present invention uses a kalman filter to blend the global positioning system-derive position and velocity, the inertial measurements, and the altitude measurement from an altitude measurement device. Different from the first and second preferred embodiments of the present invention, in this method, the global positioning system satellite signal code tracking and/or carrier phase tracking are not aided by external INS solution. Again, different from the first and second preferred embodiments of the present invention, this method uses the global positioning system-derived position and velocity in the kalman filter, not the pseudorange, Doppler shift, and/or carrier phase.

Referring to FIGS. 1, 2c, 3c, 4c-1, 4c-2, 5, and 6, a third preferred embodiment of the present invention is illustrated. The third preferred embodiment of the present invention comprises the following steps:

1) Perform GPS processing and receive GPS-derived position and velocity from a global positioning system processor 30 and pass them to a central navigation processor 40.

2) Receive inertial measurements which are body angular rates and specific forces from an inertial measurement unit 10 and inject it into an inertial navigation system (INS) processor 41 (FIGS. 4c-1 and 4c-2) of the central navigation processor 40.

3) Receive the altitude measurement from an altitude measurement device 20 and pass it to the central navigation processor 40.

Figures 1, 4C:
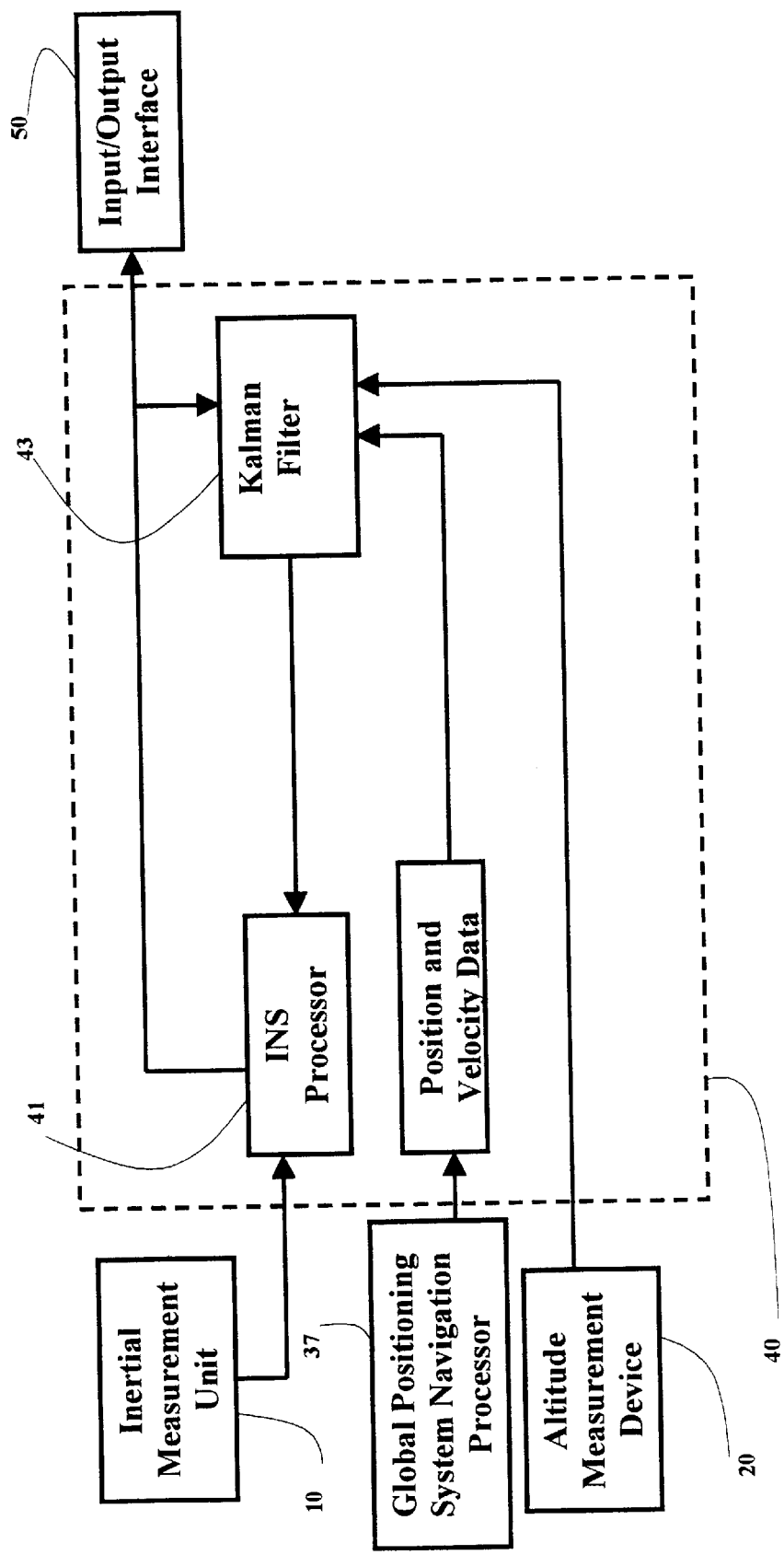
Figures 2, 4C:
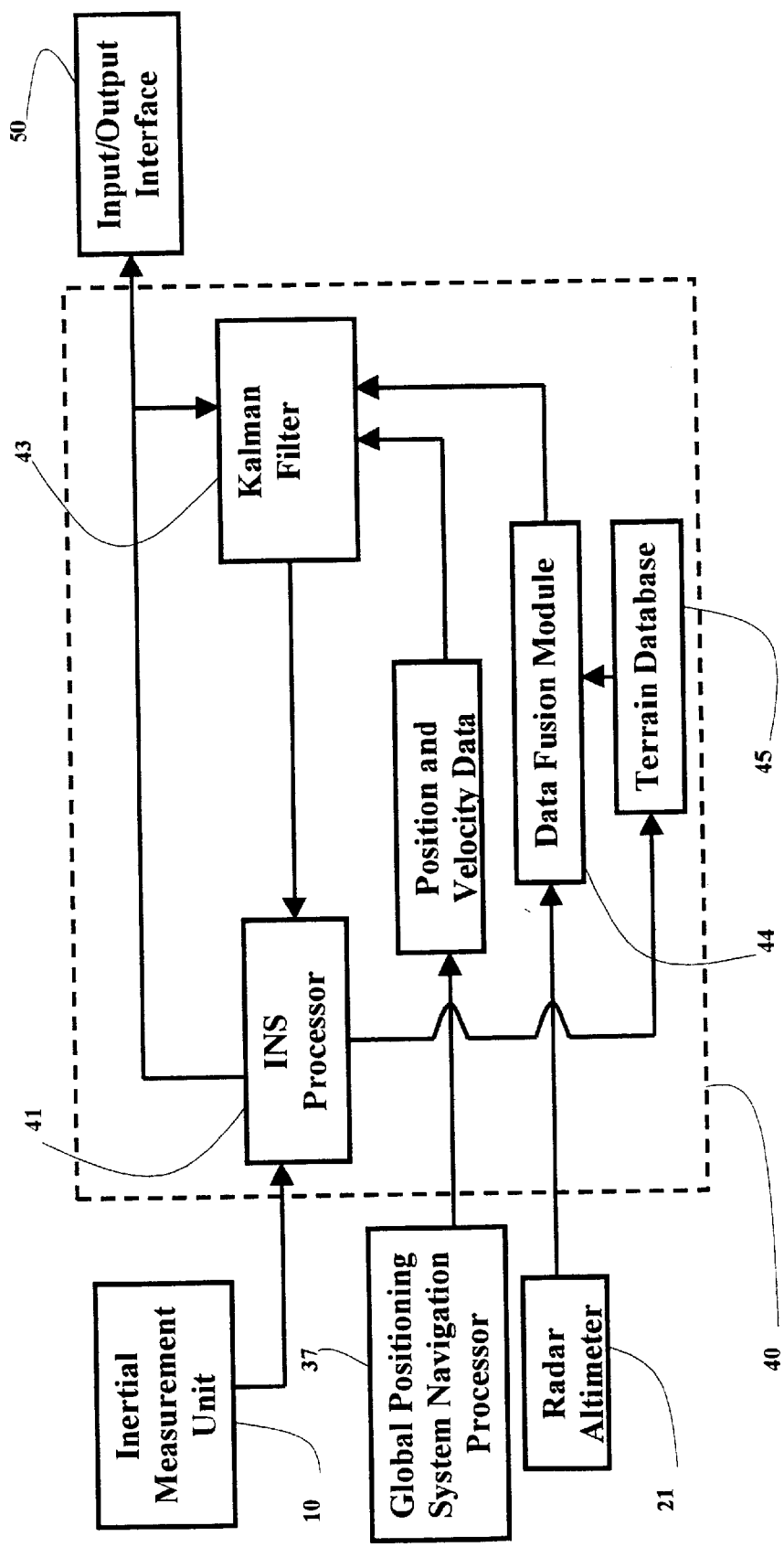

4) Blend the output of the INS processor 41, the altitude measurement, and the GPS-derive position and velocity in a kalman filter 43 (FIGS. 4c-1 and 4c-2).

5) Perform INS processing and feed back the output of the kalman filter 43 to the INS processor 41 to correct the INS navigation solution.

6) Output the navigation data from the INS processor 41 to the input/output interface 50. Other on-board avionics systems can get navigation data from the input/output interface 50.

Figure 2C:
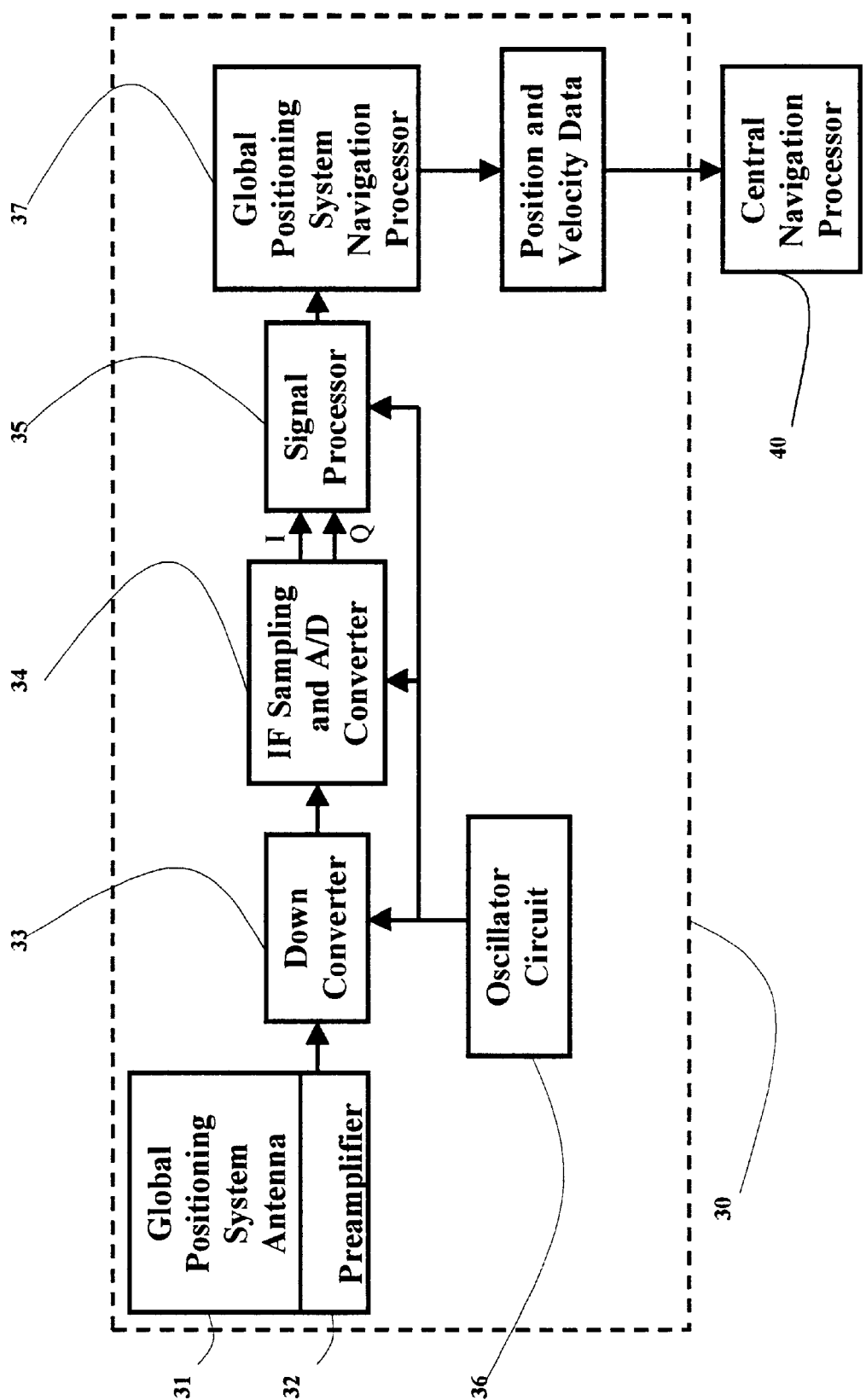
FIG. 2c is a block diagram of the global positioning system processing according to a third preferred embodiment of the present invention.

Referring to FIGS. 2c, in step (1), the global positioning system antenna 31, the preamplifier 32, the down converter 33, the IF sampling and A/D converter, the oscillator circuit 36 do the same things as that in the first and second preferred embodiment of the present invention, except the signal processor 35. The signal processor 35 receives the digitized data from the IF sampling and A/D converter 34 to extract the navigation data modulated on the GPS signal, such as the GPS satellite ephemeris, atmosphere parameters, satellite clock parameter, and time information. The signal processor 35 also processes the digital data from the IF sampling and A/D converter 34 to derive the pseudorange and Doppler shift. The extracted pseudorange and Doppler shift are sent to the GPS navigation processor. The signal processor 35 does not do the velocity and acceleration aiding of code and/or carrier phase tracking.

Referring to FIG. 2c, in step (1), a global positioning system navigation processor 37 is used to calculate the position and velocity of the platform. The global positioning system navigation processor 37 receives the pseudorange and Doppler shift from the signal processor 35 and performs kalman filtering or least square algorithm to derive the position and velocity. The position and velocity are sent to the central navigation processor 40.

Figure 3C:
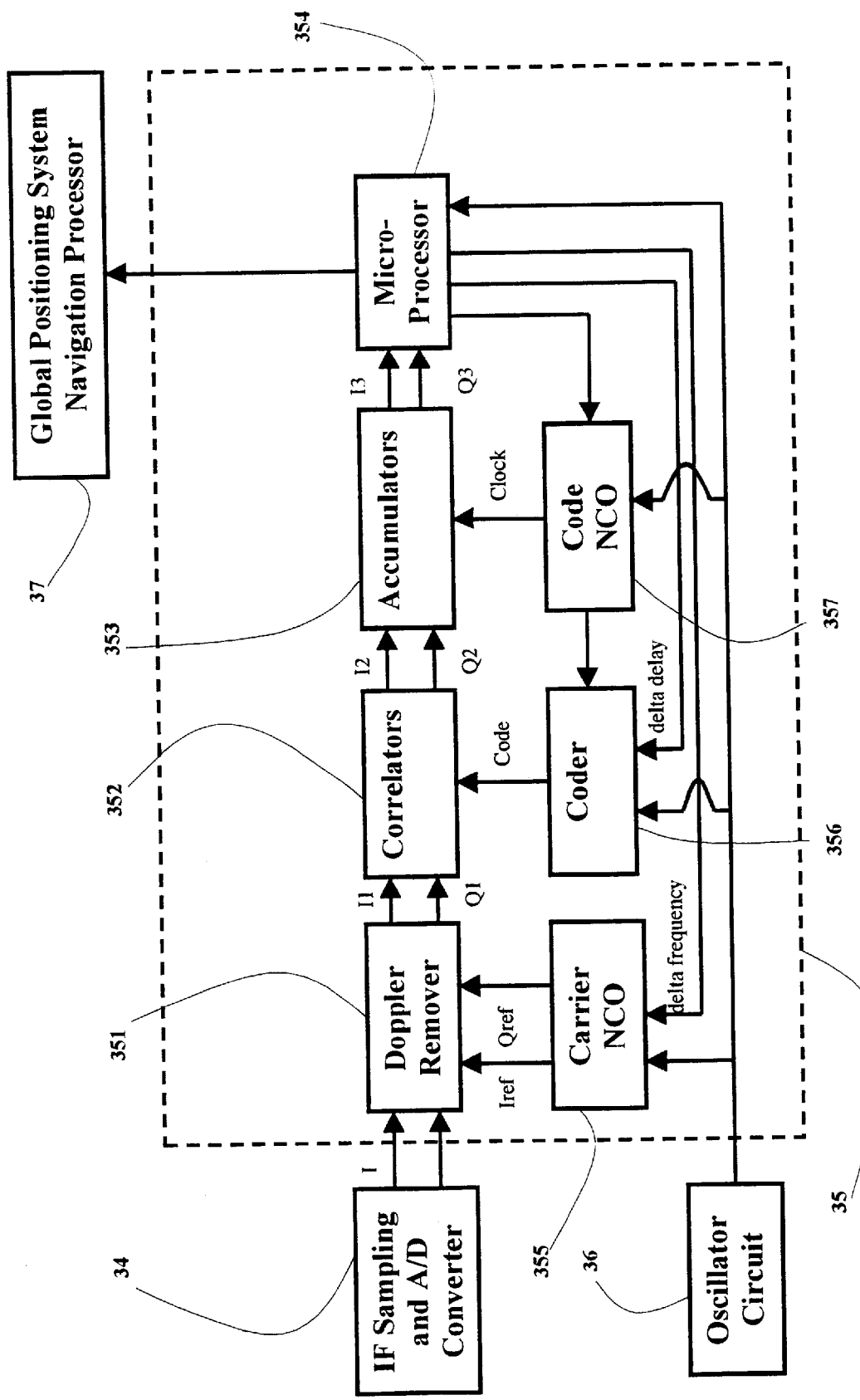
FIG. 3c is a block diagram of the global positioning system signal processing according to the above third preferred embodiment of the present invention.

Referring to FIG. 3c, in step (1), the pseudorange measurements are derived from the GPS code tracking loop which consists of a correlators 352, an accumulators 353, a micro-processor 354, a code NCO (numerical controlled oscillator) 357, and a coder 356. The Doppler shift are obtained from the GPS satellite signal frequency tracking loop which is different from the carrier phase tracking loop in the first preferred embodiment of the present invention. The frequency tracking loop comprises a Doppler removal 351, a correlators 352, an accumulators 353, a microprocessor 354, and a carrier NCO (numerical controlled oscillator) 355, where the microprocessor 354 does not perform carrier phase detection.

Referring to FIG. 3c, in step (1), the Doppler remover 351, the correlators 352, the accumulators 353, the carrier NCO 355, the coder 356, and the code NCO 357 do the same things as that in the first and second preferred embodiment of the present invention. The microprocessor 354 does different work in the thrid preferred embodiment of the present invention.

Referring to FIG. 3c, in step (1), the accumulations (I3 and Q3) coming from the acumulators 353 are stored and collected by the microprocessor 354, and the acumulators 353 are dumped, resulting in an accumulated-an-dump filtering of the signal components. The microprocessor 354 performs code tracking loop filtering, code acquisition processing, code lock detection, data recovery, and pseudorange and Doppler shift processing. The microprocessor 354 does not receive external velocity and acceleration information to performs external aiding code tracking loop filtering and/or carrier phase tracking loop filtering. The pseudorange and Doppler shift derived from the microprocessor 354 are sent to the global positioning system navigation processor 37.

Referring to FIGS. 4c-1 and 4c-2, in step (2), the inertial measurement unit 10 outputs the inertial measurements of body rates and specific forces to the INS processor 41. In step (3), the altitude measurement device measures the altitude and passes it the central navigation processor 40.

Referring to FIG. 4c-1, in step (4), the global positioning system navigation processor 37 outputs the position and velocity to the kalman filter 43 in which the data from the INS processor 41, the altitude measurement device 20, and the global positioning system navigation processor 37 are integrated to derive the position error, velocity error, and attitude error. In step (5), the INS processor 41 processes the inertial measurements, which are body angular rates and specific forces, and the position error, velocity error, and attitude error coming from the kalman filter 43 to derive the corrected navigation solution. The navigation solution includes 3-dimensional position, 3-dimensional velocity, and 3-dimensional attitude. These data are output into the kalman filter 43. On the other hand, in step (6), these data are also passed to the input/output interface 50 which provides a navigation data source for other avionics systems on board a vehicle where these avionics systems need navigation data or part of these data.

Referring to FIG. 4c-2, a radar altimeter 21 is a kind of altitude measurement device 20, which measures the altitude from the terrain to the vehicle which is called terrain altitude. FIG. 4c-2 gives the implementation of data integration processing using a radar altimeter in the third preferred embodiment of the present invention. In step (4), the terrain altitude measured by a radar altimeter 21 is blended in a data fusion module 44 with the terrain elevation derived from the terrain database 45 to determine the altitude above the mean sea level (MSL). The altitude above the mean sea level is input into the kalman filter 43 and is used as one measurement in the measurement equation of the kalman filter 43.

Referring to FIG. 4c-2, in step (4), the global positioning system navigation processor 37 outputs the position and velocity to the kalman filter 43 in which the data from the INS processor 41, the data fusion module 44, and the global positioning system navigation processor 37 are integrated to derive the position error, velocity error, and attitude error. In step (5), the INS processor 41 processes the inertial measurements, which are body angular rates and specific forces, and the position error, velocity error, and attitude error coming from the kalman filter 43 to derive the corrected navigation solution. The navigation solution includes 3-dimensional position, 3-dimensional velocity, and 3-dimensional attitude. These data are output into the kalman filter 43. On the other hand, in step (6), these data are also passed to the input/output interface 50 which provides a navigation data source for other avionics systems on board a vehicle where these avionics systems need navigation data or part of these data.

Referring to FIG. 5, in step (5), the INS processor 41 in the third preferred embodiment of the present invention do the same thing as that in the first and second preferred embodiments of the present invention.

Referring to FIG. 6, in step (4), the robust kalman filter in the third preferred embodiment of the present invention do the same thing as that in the first and second preferred embodiments of the present invention except the GPS error compensation module 437 of the kalman filter 43. The GPS error compensation module 437 gathers the GPS-derive position and velocity from the global positioning system navigation processor 37, and the position and velocity corrections from the updating state vector module 439 to perform GPS error compensation. The corrected GPS position and velocity are sent to the preprocessing module 435.

The enhanced integrated positioning system can also integrated with a cellular phone to provide the cellular phone's carrier with precision location information. This information tells the platform where are they. Also, the location information derived from this integrated positioning system can be transmitted through the cellular phone to an information/control center. The carrier's location will be displayed on a computer screen. If the carrier is an airplane, the information/control center will be an airport. The GPS receiver can also integrated with a cellular phone to provide person with his/her location information, to provide vehicle with the vehicle's motion status.

What is claimed is:

1. An enhanced integrated positioning method, comprising the steps of:

(a) receiving a plurality of global positioning system satellite signals by a GPS processor to derive position and velocity information of a vehicle and a plurality of global positioning system (GPS) raw measurements, including pseudorange, carrier phase, and Doppler shift;

(b) sending said GPS raw measurements to a central navigation processor from said GPS processor;

(c) receiving a plurality of inertial measurements including body angular rates and specific forces from an inertial measurement unit (IMU);

(d) sending said inertial measurements from said IMU to an inertial navigation system (INS) processor of said central navigation processor for computing an inertial navigation solution, including position, velocity, acceleration, and attitude of said vehicle;

(e) receiving a vehicle altitude measurement from an altitude measurement device;

(f) blending an inertial navigation solution derived from said INS processor, said GPS raw measurements from said GPS processor and said vehicle altitude measurement from said altitude measurement device in a robust Kalman filter to derive a plurality of INS corrections and GPS corrections;

(g) feeding back said INS corrections from said robust Kalman filter to said INS processor to correct said inertial navigation solution;

(h) injecting said velocity and acceleration of said vehicle from said INS processor into a micro-processor of said GPS processor to aid a plurality of global positioning system code tracking loops and a plurality of global positioning system carrier phase tracking loops for requiring and tracking said global positioning system satellite signals, wherein said micro-processor of said GPS processor outputs said GPS raw measurements including said pseudorange, said carrier phase, and said Doppler shift;

(i) injecting said GPS raw measurements from said micro-processor of said GPS processor, said inertial navigation solution from said INS processor, and said inertial corrections and said GPS corrections from said robust Kalman filter into a carrier phase integer ambiguity resolution module to fix a plurality of global positioning system satellite signal carrier phase integer ambiguity numbers;

(j) sending said global positioning system satellite signal carrier phase integer numbers from said carrier phase integer ambiguity resolution module to said robust Kalman filter to derive a further improved vehicle navigation solution; and (k) sending said inertial navigation solution from said INS processor to an I/O interface, so as to provide navigation data for an on-board avionics system.

2. An enhanced integrated positioning method, as recited in claim 1, wherein said robust Kalman filter comprises a GPS error compensation module for gathering said pseudorange, carrier phase, and Doppler frequency of said GPS measurements from said GPS processor, and said position and velocity corrections from an updating state vector module to perform GPS error compensation to form corrected GPS raw data, including pseudorange, carrier phase, and Doppler frequency, which are sent to a preprocessing module, wherein said preprocessing module receives GPS satellite ephemeris from said GPS processor said corrected GPS raw data from said GPS error compensation module, said vehicle altitude measurement from said altitude measurement device, and INS solutions from said INS processor, said preprocessing module performing calculation of state transit matrix and sending with said state vector to a state vector prediction module, wherein said calculated state transit matrix is also sent to a covariance propagation module which calculates a measurement matrix and a current measurement vector according to a computed measurement matrix and a measurement model, and that said measurement matrix and said computed current measurement vector are passed to a computing measurement residue module, said state vector prediction module receiving said state transit matrix and said state vector from said preprocessing module to perform state prediction of current epoch, said predicted current state vector being passed to said computing measurement residue module which receives predicted current state vector from said state vector prediction module and said measurement matrix and said current measurement vector from said preprocessing module, wherein said computing measurement residue module calculates measurement residues by subtracting said multiplication of said measurement matrix and said predicted current state vector from said current measurement vector, and said measurement residues are sent to a residue monitor module and said updating state vector module, wherein said residue monitor module performs a discrimination on said measurement residues received from said computing measurement residue module, wherein said covariance propagation module gathers covariance of system process from said residue monitor module, said state transit matrix from said preprocessing module, and covariance of estimated error to calculate current covariance of said estimated error which is sent to a computing optimal gain module, wherein said computing optimal gain module receives said current covariance of said estimated error from said covariance computing module to compute optimal gain which is passed to a covariance updating module and said updating state vector module, said covariance updating module updating said covariance of said estimated error and sending to said covariance propagation module, wherein said updating state vector module receives said optimal gain from said computing optimal gain module and said measurement residues from said computing measurement residue module, said updating state vector calculating said current estimate of state vector including position, velocity and attitude errors and sending to said GPS error compensation module and said INS processor.

3. An enhanced integrated positioning system, comprising:

a global positioning system (GPS) processor for providing location related information;

an inertial measurement unit (IMU) for providing inertial measurements including body angular rates and specific forces;

an altitude measurement generator for providing vehicle altitude measurement, wherein said altitude measurement generator is an altitude measurement device for providing an altitude measurement above mean sea level (MSL);

a central navigation processor, which is connected with said GPS processor, said IMU and said altitude measurement device, for fusing said location related information from said GPS processor, said inertial measurements from said IMU and said altitude measurement from said altitude measurement generator to produce navigation data of a platform, including position, velocity and attitude of said platform; and an input/output (I/O) interface, which is connected to said central navigation processor, for outputting said navigation data;

wherein said GPS processor produces a plurality of pseudorange, carrier phase, and Doppler shift; wherein said central navigation processor comprising an inertial navigation system (INS) processor, a Kalman filter, and a carrier phase integer ambiguity resolution module; wherein said pseudorange, carrier phase and Doppler shift are passed to said central navigation processor, said altitude measurement above MSL is passed to said Kalman filter, and said inertial measurements are injected into said inertial navigation system (INS) processor; wherein outputs of said INS processor, said altitude measurement above MSL and said pseudorange, carrier phase, and Doppler shift are blended in said Kalman filter, and an output of said Kalman filter is fed back to said INS processor to correct an INS navigation solution outputting from said central navigation processor to said I/O interface; wherein said INS processor provides velocity and acceleration data injecting into a micro-processor of said GPS processor to aid code and carrier phase tracking of GPS satellite signals; wherein outputs of said micro-processor of said GPS processor, said INS processor and said Kalman filter are injected into said carrier phase integer ambiguity resolution module to fix global positioning system satellite signal carrier phase integer ambiguity number; wherein said carrier phase integer ambiguity resolution module outputs carrier phase integer number into said Kalman filter to further improve positioning accuracy; wherein said INS processor outputs navigation data to said I/O interface;

wherein said microprocessor of said GPS processor outputs said pseudorange, carrier phase, and Doppler shift, global positioning system satellite ephemeris, and atmosphere parameters to said Kalman filter;

wherein said INS processor processes said inertial measurements, which are body angular rates and specific forces, and said position error, velocity error, and attitude error coming from said Kalman filter to derive said corrected navigation solution;

wherein said altitude measurement device sends said altitude measurement above MSL to said Kalman filter.

4. An enhanced integrated positioning system, as recited in claim 3, wherein said INS processor comprises an IMU I/O interface, an IMU error compensation module, a coordinate transformation computation module, an attitude position velocity computation module, a transformation matrix computation module, and an earth and vehicle rate computation module, wherein said IMU I/O interface collects said signal of said body angular rates and specific forces from said IMU for processing and converting to digital data which are corrupted by said inertial sensor measurement errors to form contaminated data that are passed to said IMU error compensation module, wherein said IMU error compensation module receives sensor error estimates derived from said Kalman filter to perform IMU error mitigation on said IMU data, said corrected inertial data being sent to said coordinate transformation computation module and said transformation matrix computation module, where said body angular rates are sent to said transformation matrix computation module and said specific forces are sent said coordinate transformation computation module, wherein said transformation matrix computation module receives said body angular rates from said IMU error computation module and an earth and vehicle rate from said earth and vehicle rate computation module to perform transformation matrix computation, said transformation matrix computation module sending said transformation matrix to said coordinate transformation computation module and attitude position velocity computation module, an attitude update algorithm in said transformation matrix computation module using said quaternion method because of its advantageous numerical and stability characteristics, wherein said coordinate transformation module collects said specific forces from said IMU error computation module and said transformation matrix from said transformation matrix computation module to perform said coordinate transformation, said coordinate transformation computation sending said specific forces transferred into said coordinate system presented by said transformation matrix to said attitude position velocity computation module, wherein said attitude position velocity computation module receives said transformed specific forces from said coordinate transformation computation module and said transformation matrix from said transformation matrix computation module to perform said attitude, position, velocity update.

5. An enhanced integrated positioning system, as recited in claim 4, wherein after computation of said position and velocity, said position and velocity errors calculated by said Kalman filter are used in said attitude position velocity computation module to correct said inertial solution.

6. An enhanced integrated positioning system, as recited in claim 5, wherein said attitude errors computed by said Kalman filter is sent to said attitude position velocity computation module to perform attitude correction in said attitude position velocity computation module.

7. An enhanced integrated positioning system, as recited in claim 5, wherein said attitude errors computed by said Kalman filter is sent to said transformation matrix computation module to perform said attitude correction before said attitude position velocity computation module.

8. An enhanced integrated positioning system, as recited in claim 6, wherein the corrected inertial solution obtained from said attitude position velocity computation module is passed to said Kalman filter to construct said measurements of said Kalman filter, moreover the corrected inertial navigation solution is also send to said carrier phase integer ambiguity resolution module to aid said global positioning system satellite carrier phase integer ambiguity fixing, and that the corrected velocity and accelerate is passed to microprocessor of said GPS processor to aid said global positioning system satellite signal carrier phase and code tracking, wherein attitude, position, and velocity computed by said attitude position velocity computation module are sent to said earth and vehicle rate computation module to calculate an Earth rotation rate and a vehicle rotation rate which are sent to said transformation matrix computation module, wherein said attitude, position, and velocity information is send to said I/O interface which provides a navigation data source.

9. An enhanced integrated positioning system, as recited in claim 7, wherein the corrected inertial solution obtained from said attitude position velocity computation module is passed to said Kalman filter to construct said measurements of said Kalman filter, moreover the corrected inertial navigation solution is also send to said carrier phase integer ambiguity resolution module to aid said global positioning system satellite carrier phase integer ambiguity fixing, and that the corrected velocity and accelerate is passed to microprocessor of said GPS processor to aid said global positioning system satellite signal carrier phase and code tracking, wherein attitude, position, and velocity computed by said attitude position velocity computation module are sent to said earth and vehicle rate computation module to calculate an Earth rotation rate and a vehicle rotation rate which are sent to said transformation matrix computation module, wherein said attitude, position, and velocity information is sent to said I/O interface which provides a navigation data source.

10. An enhanced integrated positioning system, as recited in claim 8 or 9, wherein said Kalman filter is a robust Kalman filter for providing near-optimal performance over a large class of process and measurement models and for blending GPS measurements and said inertial sensor measurements; wherein said robust Kalman filter comprises a GPS error compensation module for gathering said pseudorange, carrier phase, and Doppler frequency of said GPS measurements from said GPS processor, and said position and velocity corrections from an updating state vector module to perform GPS error compensation to form corrected GPS raw data, including pseudorange, carrier phase, and Doppler frequency, which are sent to a preprocessing module, wherein said preprocessing module receives GPS satellite ephemeris from said GPS processor said corrected GPS raw data from said GPS error compensation module, said vehicle altitude measurement from said altitude measurement device, and INS solutions from said INS processor, said preprocessing module performing calculation of state transit matrix and sending with said state vector to a state vector prediction module, wherein said calculated state transit matrix is also sent to a covariance propagation module which calculates a measurement matrix and a current measurement vector according to a computed measurement matrix and a measurement model, and that said measurement matrix and said computed current measurement vector are passed to a computing measurement residue module, said state vector prediction module receiving said state transit matrix and said state vector from said preprocessing module to perform state prediction of current epoch, said predicted current state vector being passed to said computing measurement residue module which receives predicted current state vector from said state vector prediction module and said measurement matrix and said current measurement vector from said preprocessing module, wherein said computing measurement residue module calculates measurement residues by subtracting said multiplication of said measurement matrix and said predicted current state vector from said current measurement vector, and said measurement residues are sent to a residue monitor module and said updating state vector module, wherein said residue monitor module performs a discrimination on said measurement residues received from said computing measurement residue module, wherein said covariance propagation module gathers covariance of system process from said residue monitor module, said state transit matrix from said preprocessing module, and covariance of estimated error to calculate current covariance of said estimated error which is sent to a computing optimal gain module, wherein said computing optimal gain module receives said current covariance of said estimated error from said covariance computing module to compute optimal gain which is passed to a covariance updating module and said updating state vector module, said covariance updating module updating said covariance of said estimated error and sending to said covariance propagation module, wherein said updating state vector module receives said optimal gain from said computing optimal gain module and said measurement residues from said computing measurement residue module, said updating state vector calculating said current estimate of state vector including position, velocity and attitude errors and sending to said GPS error compensation module and said INS processor.

11. An enhanced integrated positioning system, as recited in claim 8 or 9, wherein said carrier phase integer ambiguity resolution module collects position and velocity data from said INS processor, said carrier phase and Doppler shift measurement from said microprocessor of said GPS processor, and covariance matrix from said Kalman filter to fix said global positioning system satellite signal integer ambiguity number, wherein after fixing of carrier phase ambiguities, said carrier phase ambiguity number is passed to said Kalman filter to further improve said measurement accuracy of said global positioning system raw data.

12. An enhanced integrated positioning system, as recited in claim 11, wherein said carrier phase integer ambiguity resolution module comprises a geometry distance computation module, a least square adjustment module, a satellite clock model, an ionospheric model, a tropospheric model, a satellite prediction module, and a search space determination module, wherein said satellite prediction module collects ephemeris of visible global positioning system satellites from said GPS processor to perform satellite position calculation, a predicted satellite position is passed to said geometry distance computation module which receives a vehicle's precision position information from said INS processor and computes a geometrical distance between a satellite and a vehicle that is sent to said least square adjustment module, wherein said tropospheric model collects a time tag from said GPS processor and calculates a tropospheric delay of said global positioning system satellite signal using said embedded tropospheric delay model, in which said calculated troposheric delay is sent to said least square adjustment module, besides said ionospheric model collects said time tag and ionospheric parameters broadcast by said global positioning system satellite from said GPS processor, so that said ionospheric model calculates a minus time delay introduced by said ionosphere that is sent to said least square adjustment module, moreover said satellite clock model collects global positioning system satellite clock parameters to perform satellite clock correction calculation, in which said satellite clock correction is also sent to said least square adjustment module, and that said search space determination module receives covariance matrix of said measurement vector from said Kalman filter, so that based on said covariance matrix, said search space determination module derives said measurement error and determines said global positioning system satellite carrier phase integer ambiguity search space which is sent to said least square adjustment module, wherein said least square adjustment module gathers said geometrical distance from said vehicle to said global positioning system satellite from said geometry distance computation module, said tropospheric delay from said tropospheric model, said ionospheric delay from said ionospheric model, and said satellite clock correction from said satellite clock model to calculate an initial search origin, said least square adjustment module also receiving a search space from said search space determination module wherein a standard least square adjustment algorithm is applied to said initial search origin and said search space to fix said carrier phase ambiguity.

13. An enhanced integrated positioning system, comprising:

a global positioning system (GPS) processor for providing location related information;

an inertial measurement unit (IMU) for providing inertial measurements including body angular rates and specific forces;

an altitude measurement generator for providing vehicle altitude measurement, wherein said altitude measurement generator is a radar altimeter for providing an altitude measurement above a terrain;

a central navigation processor, which is connected with said GPS processor, said IMU and said altitude measurement device, for fusing said location related information from said GPS processor, said inertial measurements from said IMU and said altitude measurement from said altitude measurement generator to produce navigation data of a platform, including position, velocity and attitude of said platform; and an input/output (I/O) interface, which is connected to said central navigation processor, for outputting said navigation data;

wherein said GPS processor produces a plurality of pseudorange, carrier phase, and Doppler shift; wherein said central navigation processor comprising an inertial navigation system (INS) processor, a data fusion module, a terrain database, a Kalman filter, and a carrier phase integer ambiguity resolution module; wherein said pseudorange, carrier phase and Doppler shift are passed to said central navigation processor, said altitude measurement above terrain is passed to said data fusion module, and said inertial measurements are injected into said inertial navigation system (INS) processor; wherein outputs of said INS processor, output of said data fusion module and said pseudorange, carrier phase, and Doppler shift are blended in said Kalman filter, and an output of said Kalman filter is fed back to said INS processor to correct an INS navigation solution outputting from said central navigation processor to said I/O interface; wherein said INS processor provides velocity and acceleration data injecting into a micro-processor of said GPS processor to aid code and carrier phase tracking of GPS satellite signals; wherein outputs of said micro-processor of said GPS processor, said INS processor and said Kalman filter are injected into said carrier phase integer ambiguity resolution module to fix global positioning system satellite signal carrier phase integer ambiguity number; wherein said carrier phase integer ambiguity resolution module outputs carrier phase integer number into said Kalman filter to further improve positioning accuracy; wherein said INS processor outputs navigation data to said I/O interface;

wherein said microprocessor of said GPS processor outputs said pseudorange, carrier phase, and Doppler shift, global positioning system satellite ephemeris, and atmosphere parameters to said Kalman filter;

wherein said INS processor processes said inertial measurements, which are body angular rates and specific forces, and said position error, velocity error, and attitude error coming from said Kalman filter to derive said corrected navigation solution;

wherein said radar altimeter sends vehicle altitude measurement to said data fusion module, said INS processor sends said vehicle position information to said terrain database, said terrain database performs database query to derive a terrain height above the mean sea level and sends said terrain height to said data fusion module, said data fusion module receives said vehicle altitude measurement above terrain from said radar altimeter and said terrain height from said terrain database to derive a vehicle altitude above mean sea level, said vehicle altitude above mean sea level is sent to said Kalman filter.

14. An enhanced integrated positioning system, as recited in claim 13, wherein said INS processor comprises an IMU I/O interface, an IMU error compensation module, a coordinate transformation computation module, an attitude position velocity computation module, a transformation matrix computation module, and an earth and vehicle rate computation module, wherein said IMU I/O interface collects said signal of said body angular rates and specific forces from said IMU for processing and converting to digital data which are corrupted by said inertial sensor measurement errors to form contaminated data that are passed to said IMU error compensation module, wherein said IMU error compensation module receives sensor error estimates derived from said Kalman filter to perform IMU error mitigation on said IMU data, said corrected inertial data being sent to said coordinate transformation computation module and said transformation matrix computation module, where said body angular rates are sent to said transformation matrix computation module and said specific forces are sent said coordinate transformation computation module, wherein said transformation matrix computation module receives said body angular rates from said IMU error computation module and an earth and vehicle rate from said earth and vehicle rate computation module to perform transformation matrix computation, said transformation matrix computation module sending said transformation matrix to said coordinate transformation computation module and attitude position velocity computation module, an attitude update algorithm in said transformation matrix computation module using said quaternion method because of its advantageous numerical and stability characteristics, wherein said coordinate transformation module collects said specific forces from said IMU error computation module and said transformation matrix from said transformation matrix computation module to perform said coordinate transformation, said coordinate transformation computation sending said specific forces transferred into said coordinate system presented by said transformation matrix to said attitude position velocity computation module, wherein said attitude position velocity computation module receives said transformed specific forces from said coordinate transformation computation module and said transformation matrix from said transformation matrix computation module to perform said attitude, position, velocity update.

15. An enhanced integrated positioning system, as recited in claim 14, wherein after computation of said position and velocity, said position and velocity errors calculated by said Kalman filter are used in said attitude position velocity computation module to correct said inertial solution.

16. An enhanced integrated positioning system, as recited in claim 15, wherein said attitude errors computed by said Kalman filter is sent to said attitude position velocity computation module to perform attitude correction in said attitude position velocity computation module.

17. An enhanced integrated positioning system, as recited in claim 15, wherein said attitude errors computed by said Kalman filter is sent to said transformation matrix computation module to perform said attitude correction before said attitude position velocity computation module.

18. An enhanced integrated positioning system, as recited in claim 16, wherein the corrected inertial solution obtained from said attitude position velocity computation module is passed to said Kalman filter to construct said measurements of said Kalman filter, moreover the corrected inertial navigation solution is also sent to said carrier phase integer ambiguity resolution module to aid said global positioning system satellite carrier phase integer ambiguity fixing, and that the corrected velocity and accelerate is passed to microprocessor of said GPS processor to aid said global positioning system satellite signal carrier phase and code tracking, wherein attitude, position, and velocity computed by said attitude position velocity computation module are sent to said earth and vehicle rate computation module to calculate an Earth rotation rate and a vehicle rotation rate which are sent to said transformation matrix computation module, wherein said attitude, position, and velocity information is send to said I/O interface which provides a navigation data source.

19. An enhanced integrated positioning system, as recited in claim 17, wherein the corrected inertial solution obtained from said attitude position velocity computation module is passed to said Kalman filter to construct said measurements of said Kalman filter, moreover the corrected inertial navigation solution is also send to said carrier phase integer ambiguity resolution module to aid said global positioning system satellite carrier phase integer ambiguity fixing, and that the corrected velocity and accelerate is passed to microprocessor of said GPS processor to aid said global positioning system satellite signal carrier phase and code tracking, wherein attitude, position, and velocity computed by said attitude position velocity computation module are sent to said earth and vehicle rate computation module to calculate an Earth rotation rate and a vehicle rotation rate which are sent to said transformation matrix computation module, wherein said attitude, position, and velocity information is sent to said I/O interface which provides a navigation data source.

20. An enhanced integrated positioning system, as recited in claim 18 or 19, wherein said Kalman filter is a robust Kalman filter for providing near-optimal performance over a large class of process and measurement models and for blending GPS measurements and said inertial sensor measurements; wherein said robust Kalman filter comprises a GPS error compensation module for gathering said pseudorange, carrier phase, and Doppler frequency of said GPS measurements from said GPS processor, and said position and velocity corrections from an updating state vector module to perform GPS error compensation to form corrected GPS raw data, including pseudorange, carrier phase, and Doppler frequency, which are sent to a preprocessing module, wherein said preprocessing module receives GPS satellite ephemeris from said GPS processor said corrected GPS raw data from said GPS error compensation module, said vehicle altitude measurement from said altitude measurement device, and INS solutions from said INS processor, said preprocessing module performing calculation of state transit matrix and sending with said state vector to a state vector prediction module, wherein said calculated state transit matrix is also sent to a covariance propagation module which calculates a measurement matrix and a current measurement vector according to a computed measurement matrix and a measurement model, and that said measurement matrix and said computed current measurement vector are passed to a computing measurement residue module, said state vector prediction module receiving said state transit matrix and said state vector from said preprocessing module to perform state prediction of current epoch, said predicted current state vector being passed to said computing measurement residue module which receives predicted current state vector from said state vector prediction module and said measurement matrix and said current measurement vector from said preprocessing module, wherein said computing measurement residue module calculates measurement residues by subtracting said multiplication of said measurement matrix and said predicted current state vector from said current measurement vector, and said measurement residues are sent to a residue monitor module and said updating state vector module, wherein said residue monitor module performs a discrimination on said measurement residues received from said computing measurement residue module, wherein said covariance propagation module gathers covariance of system process from said residue monitor module, said state transit matrix from said preprocessing module, and covariance of estimated error to calculate current covariance of said estimated error which is sent to a computing optimal gain module, wherein said computing optimal gain module receives said current covariance of said estimated error from said covariance computing module to compute optimal gain which is passed to a covariance updating module and said updating state vector module, said covariance updating module updating said covariance of said estimated error and sending to said covariance propagation module, wherein said updating state vector module receives said optimal gain from said computing optimal gain module and said measurement residues from said computing measurement residue module, said updating state vector calculating said current estimate of state vector including position, velocity and attitude errors and sending to said GPS error compensation module and said INS processor.

21. An enhanced integrated positioning system, as recited in claim 18 or 19, wherein said carrier phase integer ambiguity resolution module collects position and velocity data from said INS processor, said carrier phase and Doppler shift measurement from said microprocessor of said GPS processor, and covariance matrix from said Kalman filter to fix said global positioning system satellite signal integer ambiguity number, wherein after fixing of carrier phase ambiguities, said carrier phase ambiguity number is passed to said Kalman filter to further improve said measurement accuracy of said global positioning system raw data.

22. An enhanced integrated positioning system, as recited in claim 21, wherein said carrier phase integer ambiguity resolution module comprises a geometry distance computation module, a least square adjustment module, a satellite clock model, an ionospheric model, a tropospheric model, a satellite prediction module, and a search space determination module, wherein said satellite prediction module collects ephemeris of visible global positioning system satellites from said GPS processor to perform satellite position calculation, a predicted satellite position is passed to said geometry distance computation module which receives a vehicle's precision position information from said INS processor and computes a geometrical distance between a satellite and a vehicle that is sent to said least square adjustment module, wherein said tropospheric model collects a time tag from said GPS processor and calculates a tropospheric delay of said global positioning system satellite signal using said embedded tropospheric delay model, in which said calculated troposheric delay is sent to said least square adjustment module, besides said ionospheric model collects said time tag and ionospheric parameters broadcast by said global positioning system satellite from said GPS processor, so that said ionospheric model calculates a minus time delay introduced by said ionosphere that is sent to said least square adjustment module, moreover said satellite clock model collects global positioning system satellite clock parameters to perform satellite clock correction calculation, in which said satellite clock correction is also sent to said least square adjustment module, and that said search space determination module receives covariance matrix of said measurement vector from said Kalman filter, so that based on said covariance matrix, said search space determination module derives said measurement error and determines said global positioning system satellite carrier phase integer ambiguity search space which is sent to said least square adjustment module, wherein said least square adjustment module gathers said geometrical distance from said vehicle to said global positioning system satellite from said geometry distance computation module, said tropospheric delay from said tropospheric model, said ionospheric delay from said ionospheric model, and said satellite clock correction from said satellite clock model to calculate an initial search origin, said least square adjustment module also receiving a search space from said search space determination module wherein a standard least square adjustment algorithm is applied to said initial search origin and said search space to fix said carrier phase ambiguity.

23. An enhanced integrated positioning system, comprising:

a global positioning system (GPS) processor for providing location related information;

an inertial measurement unit (IMU) for providing inertial measurements including body angular rates and specific forces;

an altitude measurement generator for providing vehicle altitude measurement, wherein said altitude measurement generator is an altitude measurement device for providing an altitude measurement above mean sea level (MSL);

a central navigation processor, which is connected with said GPS processor, said IMU and said altitude measurement device, for fusing said location related information from said GPS processor, said inertial measurements from said IMU and said altitude measurement from said altitude measurement generator to produce navigation data of a platform, including position, velocity and attitude of said platform; and an input/output (I/O) interface, which is connected to said central navigation processor, for outputting said navigation data;

wherein said GPS processor produces a plurality of pseudorange and Doppler shift; wherein said central navigation processor comprising an inertial navigation system (INS) processor and a Kalman filter; wherein said pseudorange and Doppler shift are passed to said central navigation processor, said altitude measurement above MSL is passed to said Kalman filter, and said inertial measurements are injected into said inertial navigation system (INS) processor; wherein outputs of said INS processor, said altitude measurement above MSL and said pseudorange and Doppler shift are blended in said Kalman filter, and an output of said Kalman filter is fed back to said INS processor to correct an INS navigation solution outputting from said central navigation processor to said I/O interface; wherein said INS processor provides velocity and acceleration data injecting into a micro-processor of said GPS processor to aid code tracking of GPS satellite signals; wherein said INS processor outputs navigation data to said I/O interface;

wherein said microprocessor of said GPS processor outputs said pseudorange and Doppler shifts, global positioning system satellite ephemeris, and atmosphere parameters to said Kalman filter;

wherein said INS processor processes said inertial measurements, which are body angular rates and specific forces, and said position error, velocity error, and attitude error coming from said Kalman filter to derive said corrected navigation solution;

wherein said altitude measurement device sends said altitude measurement above MSL to said Kalman filter.

24. An enhanced integrated positioning system, as recited in claim 23, wherein said INS processor comprises an IMU I/O interface, an IMU error compensation module, a coordinate transformation computation module, an attitude position velocity computation module, a transformation matrix computation module, and an earth and vehicle rate computation module, wherein said IMU I/O interface collects said signal of said body angular rates and specific forces from said IMU for processing and converting to digital data which are corrupted by said inertial sensor measurement errors to form contaminated data that are passed to said IMU error compensation module, wherein said IMU error compensation module receives sensor error estimates derived from said Kalman filter to perform IMU error mitigation on said IMU data, said corrected inertial data being sent to said coordinate transformation computation module and said transformation matrix computation module, where said body angular rates are sent to said transformation matrix computation module and said specific forces are sent said coordinate transformation computation module, wherein said transformation matrix computation module receives said body angular rates from said IMU error computation module and an earth and vehicle rate from said earth and vehicle rate computation module to perform transformation matrix computation, said transformation matrix computation module sending said transformation matrix to said coordinate transformation computation module and attitude position velocity computation module, an attitude update algorithm in said transformation matrix computation module using said quaternion method because of its advantageous numerical and stability characteristics, wherein said coordinate transformation module collects said specific forces from said IMU error computation module and said transformation matrix from said transformation matrix computation module to perform said coordinate transformation, said coordinate transformation computation sending said specific forces transferred into said coordinate system presented by said transformation matrix to said attitude position velocity computation module, wherein said attitude position velocity computation module receives said transformed specific forces from said coordinate transformation computation module and said transformation matrix from said transformation matrix computation module to perform said attitude, position, velocity update.

25. An enhanced integrated positioning system, as recited in claim 24, wherein after computation of said position and velocity, said position and velocity errors calculated by said Kalman filter are used in said attitude position velocity computation module to correct said inertial solution.

26. An enhanced integrated positioning system, as recited in claim 25, wherein said attitude errors computed by said Kalman filter is sent to said attitude position velocity computation module to perform attitude correction in said attitude position velocity computation module.

27. An enhanced integrated positioning system, as recited in claim 25, wherein said attitude errors computed by said Kalman filter is sent to said transformation matrix computation module to perform said attitude correction before said attitude position velocity computation module.

28. An enhanced integrated positioning system, as recited in claim 25, 26 or 27, wherein the corrected inertial solution obtained from said attitude position velocity computation module is passed to said Kalman filter to construct said measurements of said Kalman filter, moreover the corrected inertial navigation solution is also send to said carrier phase integer ambiguity resolution module to aid said global positioning system satellite carrier phase integer ambiguity fixing, and that the corrected velocity and accelerate is passed to microprocessor of said GPS processor to aid said global positioning system satellite signal carrier phase and code tracking, wherein attitude, position, and velocity computed by said attitude position velocity computation module are sent to said earth and vehicle rate computation module to calculate an Earth rotation rate and a vehicle rotation rate which are sent to said transformation matrix computation module, wherein said attitude, position, and velocity information is sent to said I/O interface which provides a navigation data source.

29. An enhanced integrated positioning system, as recited in claim 28, wherein said Kalman filter is a robust Kalman filter for providing near-optimal performance over a large class of process and measurement models and for blending GPS measurements and said inertial sensor measurements; wherein said robust Kalman filter comprises a GPS error compensation module for gathering said pseudorange, carrier phase, and Doppler frequency of said GPS measurements from said GPS processor, and said position and velocity corrections from an updating state vector module to perform GPS error compensation to form corrected GPS raw data, including pseudorange, carrier phase, and Doppler frequency, which are sent to a preprocessing module, wherein said preprocessing module receives GPS satellite ephemeris from said GPS processor said corrected GPS raw data from said GPS error compensation module, said vehicle altitude measurement from said altitude measurement device, and INS solutions from said INS processor, said preprocessing module performing calculation of state transit matrix and sending with said state vector to a state vector prediction module, wherein said calculated state transit matrix is also sent to a covariance propagation module which calculates a measurement matrix and a current measurement vector according to a computed measurement matrix and a measurement model, and that said measurement matrix and said computed current measurement vector are passed to a computing measurement residue module, said state vector prediction module receiving said state transit matrix and said state vector from said preprocessing module to perform state prediction of current epoch, said predicted current state vector being passed to said computing measurement residue module which receives predicted current state vector from said state vector prediction module and said measurement matrix and said current measurement vector from said preprocessing module, wherein said computing measurement residue module calculates measurement residues by subtracting said multiplication of said measurement matrix and said predicted current state vector from said current measurement vector, and said measurement residues are sent to a residue monitor module and said updating state vector module, wherein said residue monitor module performs a discrimination on said measurement residues received from said computing measurement residue module, wherein said covariance propagation module gathers covariance of system process from said residue monitor module, said state transit matrix from said preprocessing module, and covariance of estimated error to calculate current covariance of said estimated error which is sent to a computing optimal gain module, wherein said computing optimal gain module receives said current covariance of said estimated error from said covariance computing module to compute optimal gain which is passed to a covariance updating module and said updating state vector module, said covariance updating module updating said covariance of said estimated error and sending to said covariance propagation module, wherein said updating state vector module receives said optimal gain from said computing optimal gain module and said measurement residues from said computing measurement residue module, said updating state vector calculating said current estimate of state vector including position, velocity and attitude errors and sending to said GPS error compensation module and said INS processor.

30. An enhanced integrated positioning system, comprising:

a global positioning system (GPS) processor for providing location related information;

an inertial measurement unit (IMU) for providing inertial measurements including body angular rates and specific forces;

an altitude measurement generator for providing vehicle altitude measurement, wherein said altitude measurement generator is a radar altimeter for providing an altitude measurement above a terrain;

a central navigation processor, which is connected with said GPS processor, said IMU and said altitude measurement device, for fusing said location related information from said GPS processor, said inertial measurements from said IMU and said altitude measurement from said altitude measurement generator to produce navigation data of a platform, including position, velocity and attitude of said platform; and an input/output (I/O) interface, which is connected to said central navigation processor, for outputting said navigation data;

wherein said GPS processor produces a plurality of pseudorange and Doppler shift; wherein said central navigation processor comprising an inertial navigation system (INS) processor and a Kalman filter; wherein said pseudorange and Doppler shift are passed to said central navigation processor, said altitude measurement above terrain is passed to said data fusion module, and said inertial measurements are injected into said inertial navigation system (INS) processor; wherein outputs of said INS processor, output of said data fusion module and said pseudorange and Doppler shift are blended in said Kalman filter, and an output of said Kalman filter is fed back to said INS processor to correct an INS navigation solution outputting from said central navigation processor to said I/O interface; wherein said INS processor provides velocity and acceleration data injecting into a micro-processor of said GPS processor to aid code tracking of GPS satellite signals; wherein said INS processor outputs navigation data to said I/O interface;

wherein said microprocessor of said GPS processor outputs said pseudorange and Doppler shifts, global positioning system satellite ephemeris, and atmosphere parameters to said Kalman filter;

wherein said INS processor processes said inertial measurements, which are body angular rates and specific forces, and said position error, velocity error, and attitude error coming from said Kalman filter to derive said corrected navigation solution;

wherein said radar altimeter sends vehicle altitude measurement to said data fusion module, said INS processor sends said vehicle position information to said terrain database, said terrain database performs database query to derive a terrain height above the mean sea level and sends said terrain height to said data fusion module, said data fusion module receives said vehicle altitude measurement above terrain from said radar altimeter and said terrain height from said terrain database to derive a vehicle altitude above mean sea level, said vehicle altitude above mean sea level is sent to said Kalman filter.

31. An enhanced integrated positioning system, as recited in claim 30, wherein said INS processor comprises an IMU I/O interface, an IMU error compensation module, a coordinate transformation computation module, an attitude position velocity computation module, a transformation matrix computation module, and an earth and vehicle rate computation module, wherein said IMU I/O interface collects said signal of said body angular rates and specific forces from said IMU for processing and converting to digital data which are corrupted by said inertial sensor measurement errors to form contaminated data that are passed to said IMU error compensation module, wherein said IMU error compensation module receives sensor error estimates derived from said Kalman filter to perform IMU error mitigation on said IMU data, said corrected inertial data being sent to said coordinate transformation computation module and said transformation matrix computation module, where said body angular rates are sent to said transformation matrix computation module and said specific forces are sent said coordinate transformation computation module, wherein said transformation matrix computation module receives said body angular rates from said IMU error computation module and an earth and vehicle rate from said earth and vehicle rate computation module to perform transformation matrix computation, said transformation matrix computation module sending said transformation matrix to said coordinate transformation computation module and attitude position velocity computation module, an attitude update algorithm in said transformation matrix computation module using said quaternion method because of its advantageous numerical and stability characteristics, wherein said coordinate transformation module collects said specific forces from said IMU error computation module and said transformation matrix from said transformation matrix computation module to perform said coordinate transformation, said coordinate transformation computation sending said specific forces transferred into said coordinate system presented by said transformation matrix to said attitude position velocity computation module, wherein said attitude position velocity computation module receives said transformed specific forces from said coordinate transformation computation module and said transformation matrix from said transformation matrix computation module to perform said attitude, position, velocity update.

32. An enhanced integrated positioning system, as recited in claim 31, wherein after computation of said position and velocity, said position and velocity errors calculated by said Kalman filter are used in said attitude position velocity computation module to correct said inertial solution.

33. An enhanced integrated positioning system, as recited in claim 32, wherein said attitude errors computed by said Kalman filter is sent to said attitude position velocity computation module to perform attitude correction in said attitude position velocity computation module.

34. An enhanced integrated positioning system, as recited in claim 32, wherein said attitude errors computed by said Kalman filter is sent to said transformation matrix computation module to perform said attitude correction before said attitude position velocity computation module.

35. An enhanced integrated positioning system, as recited in claim 32, 33 or 34, wherein the corrected inertial solution obtained from said attitude position velocity computation module is passed to said Kalman filter to construct said measurements of said Kalman filter, and that the corrected velocity and accelerate is passed to microprocessor of said GPS processor to aid said global positioning system satellite signal carrier phase and code tracking, wherein attitude, position, and velocity computed by said attitude position velocity computation module are sent to said earth and vehicle rate computation module to calculate an Earth rotation rate and a vehicle rotation rate which are sent to said transformation matrix computation module, wherein said attitude, position, and velocity information is send to said I/O interface which provides a navigation data source for avionics systems onboard a vehicle.

36. An enhanced integrated positioning system, as recited in claim 35 wherein said Kalman filter is a robust Kalman filter for providing near-optimal performance over a large class of process and measurement models and for blending GPS measurements and said inertial sensor measurements.

37. An enhanced integrated positioning system, as recited in claim 36, wherein said robust Kalman filter comprises a GPS error compensation module for gathering said pseudorange and Doppler frequency of said GPS measurements from said GPS processor, and said position and velocity corrections from an updating state vector module to perform GPS error compensation to form corrected GPS raw data, including pseudorange, and Doppler frequency, which are sent to a preprocessing module, wherein said preprocessing module receives GPS satellite ephemeris from said GPS processor said corrected GPS raw data from said GPS error compensation module, said vehicle altitude measurement from said altitude measurement device, and INS solutions from said INS processor, said preprocessing module performing calculation of state transit matrix and sending with said state vector to a state vector prediction module, wherein said calculated state transit matrix is also sent to a covariance propagation module which calculates a measurement matrix and a current measurement vector according to a computed measurement matrix and a measurement model, and that said measurement matrix and said computed current measurement vector are passed to a computing measurement residue module, said state vector prediction module receiving said state transit matrix and said state vector from said preprocessing module to perform state prediction of current epoch, said predicted current state vector being passed to said computing measurement residue module which receives predicted current state vector from said state vector prediction module and said measurement matrix and said current measurement vector from said preprocessing module, wherein said computing measurement residue module calculates measurement residues by subtracting said multiplication of said measurement matrix and said predicted current state vector from said current measurement vector, and said measurement residues are sent to a residue monitor module and said updating state vector module, wherein said residue monitor module performs a discrimination on said measurement residues received from said computing measurement residue module, wherein said covariance propagation module gathers covariance of system process from said residue monitor module, said state transit matrix from said preprocessing module, and covariance of estimated error to calculate current covariance of said estimated error which is sent to a computing optimal gain module, wherein said computing optimal gain module receives said current covariance of said estimated error from said covariance computing module to compute optimal gain which is passed to a covariance updating module and said updating state vector module, said covariance updating module updating said covariance of said estimated error and sending to said covariance propagation module, wherein said updating state vector module receives said optimal gain from said computing optimal gain module and said measurement residues from said computing measurement residue module, said updating state vector calculating said current estimate of state vector including position, velocity and attitude errors and sending to said GPS error compensation module and said INS processor.

38. An enhanced integrated positioning system, comprising:

a global positioning system (GPS) processor for providing location related information;

an inertial measurement unit (IMU) for providing inertial measurements including body angular rates and specific forces;

an altitude measurement generator for providing vehicle altitude measurement, wherein said altitude measurement generator is an altitude measurement device for providing an altitude measurement above mean sea level (MSL);

a central navigation processor, which is connected with said GPS processor, said IMU and said altitude measurement device, for fusing said location related information from said GPS processor, said inertial measurements from said IMU and said altitude measurement from said altitude measurement generator to produce navigation data of a platform, including position, velocity and attitude of said platform; and an input/output (I/O) interface, which is connected to said central navigation processor, for outputting said navigation data;

wherein said GPS processor provides GPS location data; wherein said central navigation processor connected with said GPS processor, said IMU and said altitude measurement device, said central navigation processor comprising an inertial navigation system (INS) processor and a Kalman filter; wherein said GPS location data are passed to said central navigation processor, said altitude measurement above MSL is passed to said Kalman filter, and said inertial measurements are inject into said inertial navigation system (INS) processor; wherein outputs of said INS processor, said altitude measurement above MSL and said GPS location data are blended in said Kalman filter, and that an output of said Kalman filter is fed back to said INS processor to correct an INS navigation solution outputting from said central navigation processor to said I/O interface;

wherein a GPS navigation processor of said GPS processor outputs said GPS location data, global positioning system satellite ephemeris, and atmosphere parameters to said Kalman filter.

wherein said INS processor processes said inertial measurements, which are body angular rates and specific forces, and said position error, velocity error, and attitude error coming from said Kalman filter to derive said corrected navigation solution.

wherein said altitude measurement device sends said altitude measurement above MSL to said Kalman filter.

39. An enhanced integrated positioning system, as recited in claim 38, wherein said INS processor comprises an IMU I/O interface, an IMU error compensation module, a coordinate transformation computation module, an attitude position velocity computation module, a transformation matrix computation module, and an earth and vehicle rate computation module, wherein said IMU I/O interface collects said signal of said body angular rates and specific forces from said IMU for processing and converting to digital data which are corrupted by said inertial sensor measurement errors to form contaminated data that are passed to said IMU error compensation module, wherein said IMU error compensation module receives sensor error estimates derived from said Kalman filter to perform IMU error mitigation on said IMU data, said corrected inertial data being sent to said coordinate transformation computation module and said transformation matrix computation module, where said body angular rates are sent to said transformation matrix computation module and said specific forces are sent said coordinate transformation computation module, wherein said transformation matrix computation module receives said body angular rates from said IMU error computation module and an earth and vehicle rate from said earth and vehicle rate computation module to perform transformation matrix computation, said transformation matrix computation module sending said transformation matrix to said coordinate transformation computation module and attitude position velocity computation module, an attitude update algorithm in said transformation matrix computation module using said quaternion method because of its advantageous numerical and stability characteristics, wherein said coordinate transformation module collects said specific forces from said IMU error computation module and said transformation matrix from said transformation matrix computation module to perform said coordinate transformation, said coordinate transformation computation sending said specific forces transferred into said coordinate system presented by said transformation matrix to said attitude position velocity computation module, wherein said attitude position velocity computation module receives said transformed specific forces from said coordinate transformation computation module and said transformation matrix from said transformation matrix computation module to perform said attitude, position, velocity update.

40. An enhanced integrated positioning system, as recited in claim 39, wherein after computation of said position and velocity, said position and velocity errors calculated by said Kalman filter are used in said attitude position velocity computation module to correct said inertial solution.

41. An enhanced integrated positioning system, as recited in claim 40, wherein said attitude errors computed by said Kalman filter is sent to said attitude position velocity computation module to perform attitude correction in said attitude position velocity computation module.

42. An enhanced integrated positioning system, as recited in claim 40, wherein said attitude errors computed by said Kalman filter is sent to said transformation matrix computation module to perform said attitude correction before said attitude position velocity computation module.

43. An enhanced integrated positioning system, as recited in claim 41 or 42, wherein the corrected inertial solution obtained from said attitude position velocity computation module is passed to said Kalman filter to construct said measurements of said Kalman filter, wherein attitude, position, and velocity computed by said attitude position velocity computation module are sent to said earth and vehicle rate computation module to calculate an Earth rotation rate and a vehicle rotation rate which are sent to said transformation matrix computation module, wherein said attitude, position, and velocity information is send to said I/O interface which provides a navigation data source for avionics systems onboard a vehicle.

44. An enhanced integrated positioning system, as recited in claim 43, wherein said Kalman filter is a robust Kalman filter for providing near-optimal performance over a large class of process and measurement models and for blending GPS location data, said altitude measurement above MSL and said inertial sensor measurements.

45. An enhanced integrated positioning system, as recited in claim 44, wherein said robust Kalman filter comprises a GPS error compensation module for gathering said GPS location data from said GPS processor, and said position and velocity corrections from an updating state vector module to perform GPS error compensation to form corrected GPS location data, which are sent to a preprocessing module, wherein said preprocessing module receives GPS satellite ephemeris from said GPS processor said corrected GPS location data from said GPS error compensation module, said altitude measurement above MSL from said altitude measurement device, and INS solutions from said INS processor, said preprocessing module performing calculation of state transit matrix and sending with said state vector to a state vector prediction module, wherein said calculated state transit matrix is also sent to a covariance propagation module which calculates a measurement matrix and a current measurement vector according to a computed measurement matrix and a measurement model, and that said measurement matrix and said computed current measurement vector are passed to a computing measurement residue module, said state vector prediction module receiving said state transit matrix and said state vector from said preprocessing module to perform state prediction of current epoch, said predicted current state vector being passed to said computing measurement residue module which receives predicted current state vector from said state vector prediction module and said measurement matrix and said current measurement vector from said preprocessing module, wherein said computing measurement residue module calculates measurement residues by subtracting said multiplication of said measurement matrix and said predicted current state vector from said current measurement vector, and said measurement residues are sent to a residue monitor module and said updating state vector module, wherein said residue monitor module performs a discrimination on said measurement residues received from said computing measurement residue module, wherein said covariance propagation module gathers covariance of system process from said residue monitor module, said state transit matrix from said preprocessing module, and covariance of estimated error to calculate current covariance of said estimated error which is sent to a computing optimal gain module, wherein said computing optimal gain module receives said current covariance of said estimated error from said covariance computing module to compute optimal gain which is passed to a covariance updating module and said updating state vector module, said covariance updating module updating said covariance of said estimated error and sending to said covariance propagation module, wherein said updating state vector module receives said optimal gain from said computing optimal gain module and said measurement residues from said computing measurement residue module, said updating state vector calculating said current estimate of state vector including position, velocity and attitude errors and sending to said GPS error compensation module and said INS processor.

46. An enhanced integrated positioning system, comprising:

a global positioning system (GPS) processor for providing location related information;

an inertial measurement unit (IMU) for providing inertial measurements including body angular rates and specific forces;

an altitude measurement generator for providing vehicle altitude measurement, wherein said altitude measurement generator is a radar altimeter for providing an altitude measurement above a terrain;

a central navigation processor, which is connected with said GPS processor, said IMU and said altitude measurement device, for fusing said location related information from said GPS processor, said inertial measurements from said IMU and said altitude measurement from said altitude measurement generator to produce navigation data of a platform, including position, velocity and attitude of said platform; and an input/output (I/O) interface, which is connected to said central navigation processor, for outputting said navigation data;

wherein said GPS processor provides GPS location data; wherein said central navigation processor connected with said GPS processor, said IMU and said radar altimeter, said central navigation processor comprising an inertial navigation system (INS) processor, a data fusion module, a terrain database, and a Kalman filter; wherein said GPS location data are passed to said central navigation processor, output of said radar altimeter is passed to said data fusion module, and said inertial measurements are inject into said inertial navigation system (INS) processor; wherein outputs of said INS processor, output of said data fusion module and said GPS location data are blended in said Kalman filter, and that an output of said Kalman filter is fed back to said INS processor to correct an INS navigation solution outputting from said central navigation processor to said I/O interface;

wherein a GPS navigation processor of said GPS processor outputs said GPS location data, global positioning system satellite ephemeris, and atmosphere parameters to said Kalman filter;

wherein said INS processor processes said inertial measurements, which are body angular rates and specific forces, and said position error, velocity error, and attitude error coming from said Kalman filter to derive said corrected navigation solution;

wherein said radar altimeter sends vehicle altitude measurement to said data fusion module, said INS processor sends said vehicle position information to said terrain database, said terrain database performs database query to derive a terrain height above the mean sea level and sends said terrain height to said data fusion module, said data fusion module receives said vehicle altitude measurement above terrain from said radar altimeter and said terrain height from said terrain database to derive a vehicle altitude above mean sea level, said vehicle altitude above mean sea level is sent to said Kalman filter.

47. An enhanced integrated positioning system, as recited in claim 46, wherein said INS processor comprises an IMU I/O interface, an IMU error compensation module, a coordinate transformation computation module, an attitude position velocity computation module, a transformation matrix computation module, and an earth and vehicle rate computation module, wherein said IMU I/O interface collects said signal of said body angular rates and specific forces from said IMU for processing and converting to digital data which are corrupted by said inertial sensor measurement errors to form contaminated data that are passed to said IMU error compensation module, wherein said IMU error compensation module receives sensor error estimates derived from said Kalman filter to perform IMU error mitigation on said IMU data, said corrected inertial data being sent to said coordinate transformation computation module and said transformation matrix computation module, where said body angular rates are sent to said transformation matrix computation module and said specific forces are sent said coordinate transformation computation module, wherein said transformation matrix computation module receives said body angular rates from said IMU error computation module and an earth and vehicle rate from said earth and vehicle rate computation module to perform transformation matrix computation, said transformation matrix computation module sending said transformation matrix to said coordinate transformation computation module and attitude position velocity computation module, an attitude update algorithm in said transformation matrix computation module using said quaternion method because of its advantageous numerical and stability characteristics, wherein said coordinate transformation module collects said specific forces from said IMU error computation module and said transformation matrix from said transformation matrix computation module to perform said coordinate transformation, said coordinate transformation computation sending said specific forces transferred into said coordinate system presented by said transformation matrix to said attitude position velocity computation module, wherein said attitude position velocity computation module receives said transformed specific forces from said coordinate transformation computation module and said transformation matrix from said transformation matrix computation module to perform said attitude, position, velocity update.

48. An enhanced integrated positioning system, as recited in claim 47, wherein after computation of said position and velocity, said position and velocity errors calculated by said Kalman filter are used in said attitude position velocity computation module to correct said inertial solution.

49. An enhanced integrated positioning system, as recited in claim 48, wherein said attitude errors computed by said Kalman filter is sent to said attitude position velocity computation module to perform attitude correction in said attitude position velocity computation module.

50. An enhanced integrated positioning system, as recited in claim 48, wherein said attitude errors computed by said Kalman filter is sent to said transformation matrix computation module to perform said attitude correction before said attitude position velocity computation module.

51. An enhanced integrated positioning system, as recited in claim 49 or 50, wherein the corrected inertial solution obtained from said attitude position velocity computation module is passed to said Kalman filter to construct said measurements of said Kalman filter, wherein attitude, position, and velocity computed by said attitude position velocity computation module are sent to said earth and vehicle rate computation module to calculate an Earth rotation rate and a vehicle rotation rate which are sent to said transformation matrix computation module, wherein said attitude, position, and velocity information is send to said I/O interface which provides a navigation data source for avionics systems onboard a vehicle.

52. An enhanced integrated positioning system, as recited in claim 50, wherein said Kalman filter is a robust Kalman filter for providing near-optimal performance over a large class of process and measurement models and for blending GPS location data, said altitude measurement above MSL and said inertial sensor measurements.

53. An enhanced integrated positioning system, as recited in claim 52, wherein said robust Kalman filter comprises a GPS error compensation module for gathering said GPS location data from said GPS processor, and said position and velocity corrections from an updating state vector module to perform GPS error compensation to form corrected GPS location data, which are sent to a preprocessing module, wherein said preprocessing module receives GPS satellite ephemeris from said GPS processor said corrected GPS location data from said GPS error compensation module, said altitude measurement above MSL from said altitude measurement device, and INS solutions from said INS processor, said preprocessing module performing calculation of state transit matrix and sending with said state vector to a state vector prediction module, wherein said calculated state transit matrix is also sent to a covariance propagation module which calculates a measurement matrix and a current measurement vector according to a computed measurement matrix and a measurement model, and that said measurement matrix and said computed current measurement vector are passed to a computing measurement residue module, said state vector prediction module receiving said state transit matrix and said state vector from said preprocessing module to perform state prediction of current epoch, said predicted current state vector being passed to said computing measurement residue module which receives predicted current state vector from said state vector prediction module and said measurement matrix and said current measurement vector from said preprocessing module, wherein said computing measurement residue module calculates measurement residues by subtracting said multiplication of said measurement matrix and said predicted current state vector from said current measurement vector, and said measurement residues are sent to a residue monitor module and said updating state vector module, wherein said residue monitor module performs a discrimination on said measurement residues received from said computing measurement residue module, wherein said covariance propagation module gathers covariance of system process from said residue monitor module, said state transit matrix from said preprocessing module, and covariance of estimated error to calculate current covariance of said estimated error which is sent to a computing optimal gain module, wherein said computing optimal gain module receives said current covariance of said estimated error from said covariance computing module to compute optimal gain which is passed to a covariance updating module and said updating state vector module, said covariance updating module updating said covariance of said estimated error and sending to said covariance propagation module, wherein said updating state vector module receives said optimal gain from said computing optimal gain module and said measurement residues from said computing measurement residue module, said updating state vector calculating said current estimate of state vector including position, velocity and attitude errors and sending to said GPS error compensation module and said INS processor.

* * * * *